United States Patent
Wifvesson et al.

(10) Patent No.: US 11,546,765 B2
(45) Date of Patent: Jan. 3, 2023

(54) MASTER GNODEBS AND METHOD OF OPERATING MASTER GNODEB

(71) Applicant: Telefonaktiebolaget LM Ericsson (publ), Stockholm (SE)

(72) Inventors: Monica Wifvesson, Lund (SE); Noamen Ben Henda, Vällingby (SE); Prajwol Kumar Nakarmi, Sollentuna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 80 days.

(21) Appl. No.: 17/054,685

(22) PCT Filed: May 14, 2019

(86) PCT No.: PCT/EP2019/062319
§ 371 (c)(1),
(2) Date: Nov. 11, 2020

(87) PCT Pub. No.: WO2019/219667
PCT Pub. Date: Nov. 21, 2019

(65) Prior Publication Data
US 2021/0076218 A1  Mar. 11, 2021

Related U.S. Application Data

(60) Provisional application No. 62/671,373, filed on May 14, 2018.

(51) Int. Cl.
*H04W 12/10* (2021.01)
*H04W 36/00* (2009.01)
(Continued)

(52) U.S. Cl.
CPC ......... *H04W 12/106* (2021.01); *H04L 63/123* (2013.01); *H04L 63/20* (2013.01); *H04W 36/0027* (2013.01)

(58) Field of Classification Search
CPC .......... H04W 12/106; H04W 36/0027; H04W 76/15; H04W 4/70; H04W 36/0069;
(Continued)

(56) References Cited

U.S. PATENT DOCUMENTS

2018/0092085 A1\* 3/2018 Shaheen ........... H04W 36/0022
2019/0082325 A1\* 3/2019 Muhanna ............. H04L 63/061

OTHER PUBLICATIONS

International Search Report and Written Opinion of the International Searching Authority for PCT International Application No. PCT/EP2019/062319 dated Jul. 26, 2019.
(Continued)

*Primary Examiner* — Quazi Farooqui
(74) *Attorney, Agent, or Firm* — Sage Patent Group

(57) ABSTRACT

A method of operating a Master gNodeB (MgNB) in a radio access network RAN is disclosed. An indication of a user plane security policy is received from a core network node, wherein the user plane security policy requires user plane integrity protection for a protocol data unit PDU session. Responsive to the user plane security policy requiring user plane integrity protection for the PDU session and responsive to determining that a secondary base station supporting the user plane security policy requiring user plane integrity protection is unavailable, a data radio bearer DRB of the PDU session is established directly between the MgNB and a user equipment UE. Related MgNBs are also discussed.

18 Claims, 19 Drawing Sheets

Non-Roaming 5G System Architecture in Reference Point Representation

(51) Int. Cl.
*H04L 29/06* (2006.01)
*H04W 12/106* (2021.01)
*H04L 9/40* (2022.01)

(58) Field of Classification Search
CPC .... H04W 12/10; H04W 36/00; H04L 63/123; H04L 63/20; H04L 5/0007; H04L 5/001; H04L 29/06
See application file for complete search history.

(56) References Cited

OTHER PUBLICATIONS

3GPP TS 23.501 V15.1.0, "3rd Generation Partnership Project; Technical Specification Group Services and System Aspects; System Architecture for the 5G System; Stage 2 (Release 15)," Technical Specification, Mar. 2018, 201 pages.
3GPP TS 33.501 V15.0.0, "3rd Generation Partnership Project; Technical Specification Group Services and System Aspects; Security architecture and procedures for 5G system (Release 15)," Technical Specification, Mar. 2018, 128 pages.
3GPP TS 33.401 V15.3.0, "3rd Generation Partnership Project; Technical Specification Group Services and System Aspects; 3GPP System Architecture Evolution (SAE); Security architecture (Release 15)," Technical Specification, Mar. 2018, 163 pages.

* cited by examiner

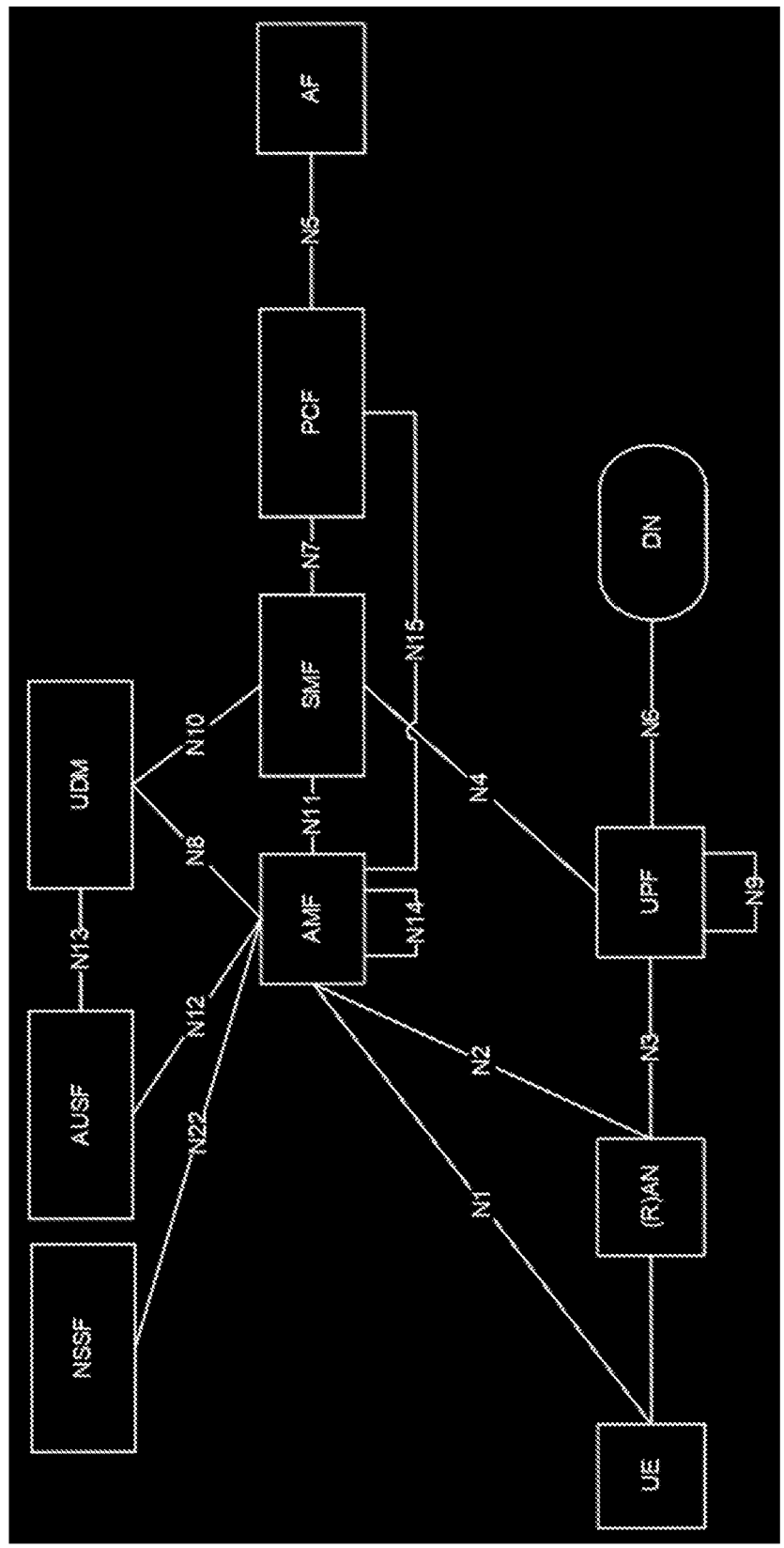

EN-EC Overall Architecture

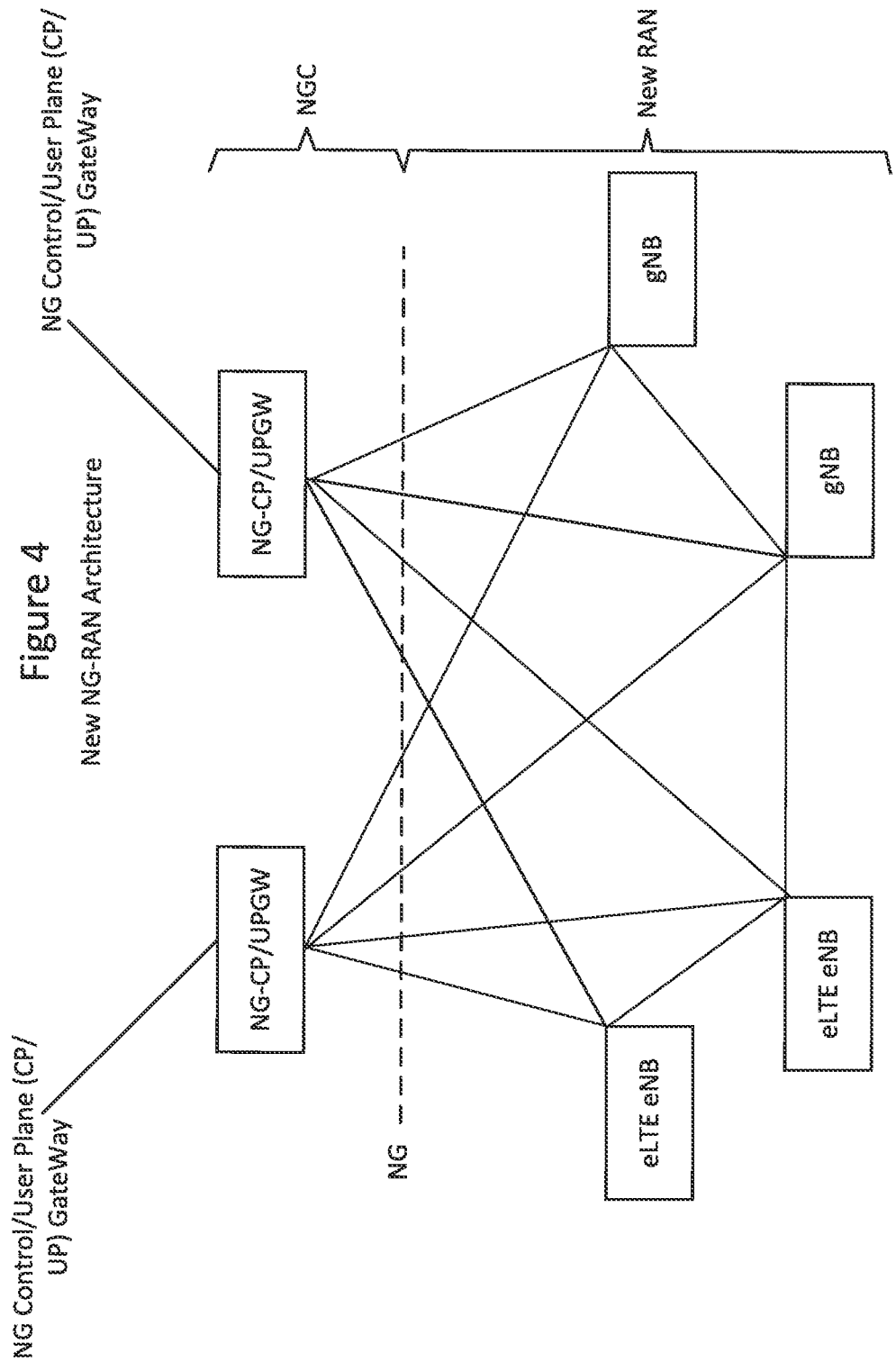

Control Plane Architecture For MR-DC With 5GC

Control Plane Architecture for EN-DC

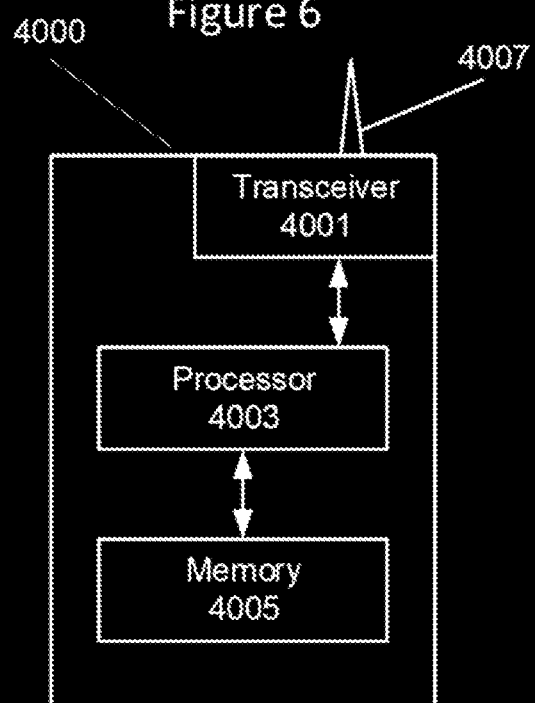
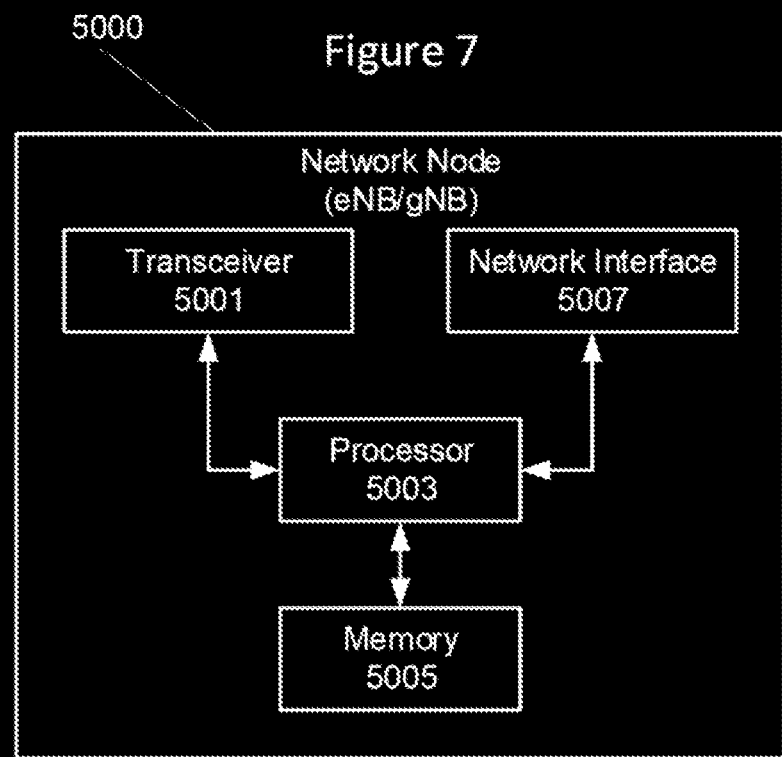

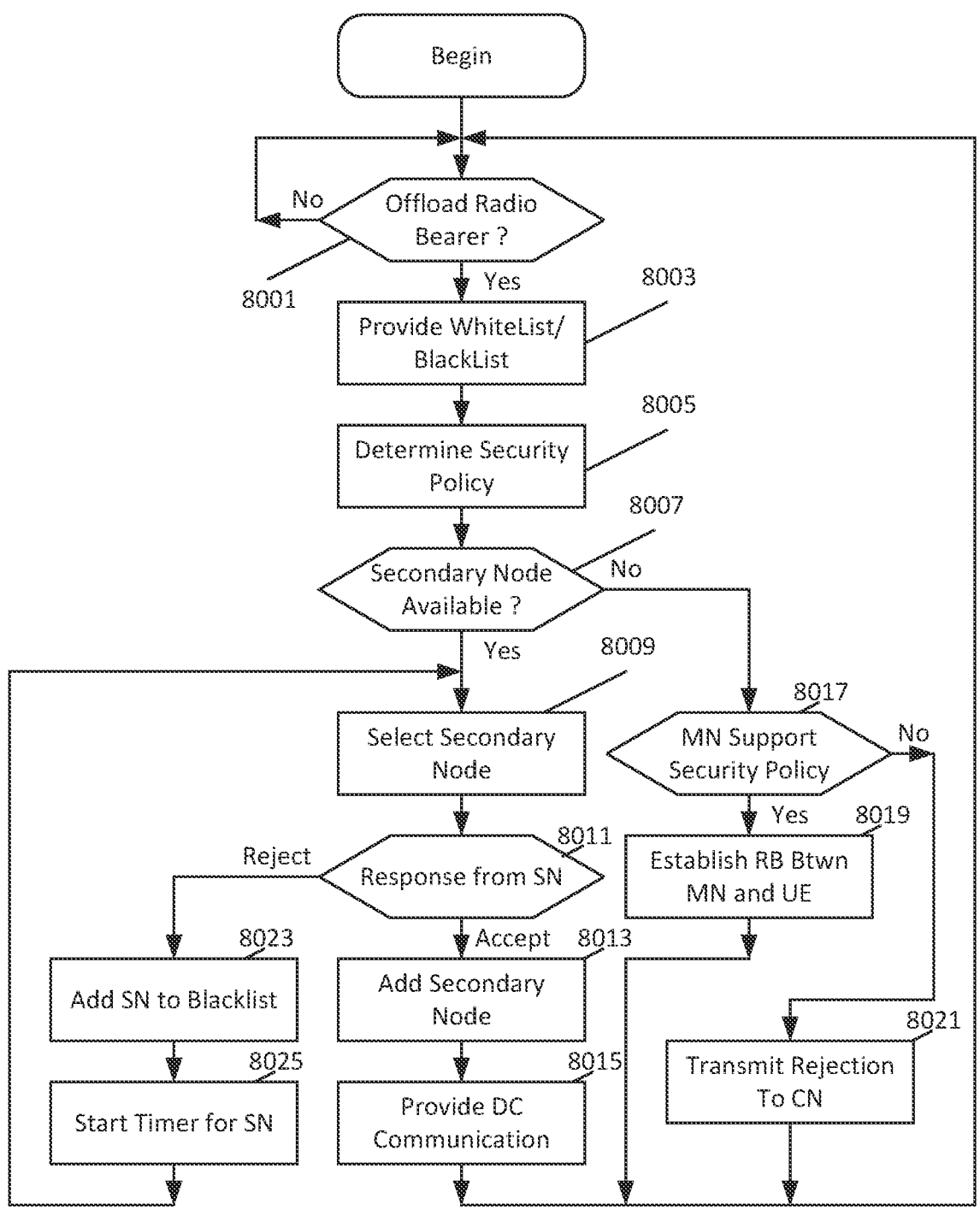

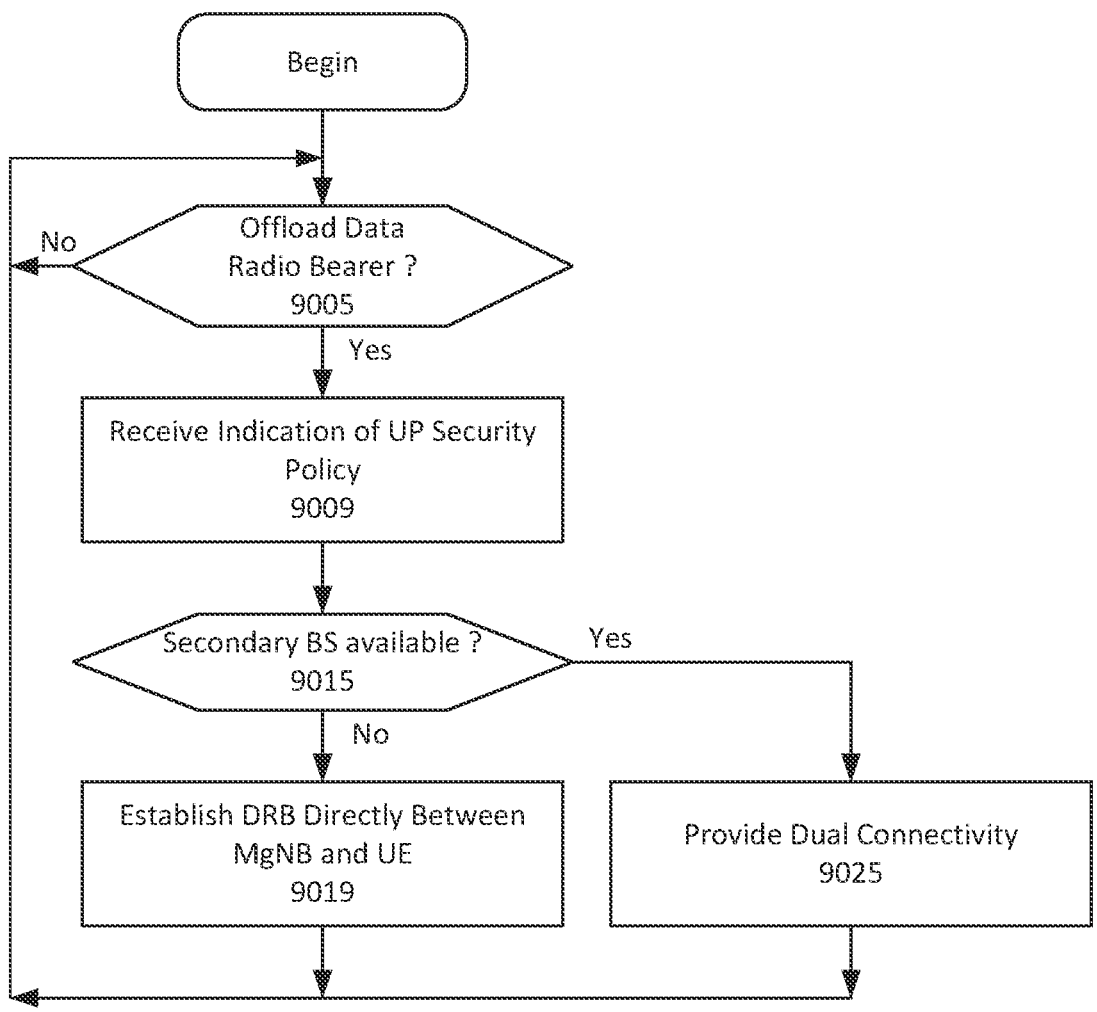

MASTER GNODEBS AND METHOD OF OPERATING MASTER GNODEB

CROSS REFERENCE TO RELATED APPLICATIONS

This application is a 35 U.S.C. § 371 national stage application of PCT International Application No. PCT/EP2019/062319 filed on May 14, 2019, which claims the benefit of U.S. Provisional Patent Application Ser. No. 62/671,373, filed on May 14, 2018, the disclosures and content of which are incorporated by reference herein in their entireties.

TECHNICAL FIELD

The present disclosure relates generally to Master gNodeBs and a method of operating a Master gNodeB.

BACKGROUND

3GPP is currently developing the standards for fifth generation 5G (also known as Next Generation or NG) Systems. It is expected that 5G will support many new scenarios and use cases and will be an enabler for the Internet of Things IoT. It is expected that NG systems will provide connectivity to a wide range of new devices such as sensors, smart wearables, vehicles, machines, etc. Flexibility may thus be a key property in NG Systems. This is reflected in the security requirement for network access that mandate the support of alternative authentication methods and different types of credentials than the usual Authentication and Key Agreement AKA credentials pre-provisioned by the operator and securely stored in the Universal Integrated Circuit Card UICC. This would allow factory owners or enterprises to leverage their own identity and credential management systems for authentication and access network security.

The 3GPP architecture working group (SA2) has finalized the architecture of 5G Systems illustrated below in FIG. 1 from TS 23.501 [1]. FIG. 1 illustrates a non-roaming 5G System Architecture in reference point representation.

Going back one generation, a feature called Dual Connectivity (DC) was introduced in Long Term Evolution LTE in order to boost the performance of the system allowing it to leverage base stations (which are called eNBs in LTE) with a non-ideal backhaul. This feature is realized by a base station endorsing the role of a Master Node (MN) connected to another base station endorsing the role of a Secondary Node (SN) and allowing the MN to utilize the resources of the SN by offloading data radio bearers to the SN.

In the context of 5G, a similar feature called Enhanced Dual Connectivity was introduced in LTE as described in option 3/3a in FIG. 2B below in order to enable usage of the New Radio (NR) which is the 5G radio technology. In this feature the MN is an enhanced eNB and the SN is a gNB (which is a base station providing NR radio access).

This feature called Dual Connectivity DC will be supported, with some enhancements, in 5G systems as well. The network architecture options 4/4a and 7/a for Dual Connectivity in 5G systems involving multiple radio access technology (RAT) and a 5G core network (CN) are shown in FIGS. 2C and 2E. FIGS. 2A-E illustrate architecture options for Dual Connectivity DC in 5G systems including options 4/4a and 7/7a.

As a background on Option 3/3a of FIG. 2B, E-UTRAN supports Multi-RAT-Dual Connectivity via E-UTRA-NR Dual Connectivity (EN-DC) since Release 15, in which a UE is connected to one eNB that acts as a MN and one en-gNB that acts as an SN. The eNB is connected to the EPC via the S1 interface and to the en-gNB via the X2 interface. The en-gNB might also be connected to the EPC via the S1-U interface and to other en-gNBs via the X2-U interface. User Plane UP integrity protection is not supported in eNB acting as Master Node in Enhanced Dual Connectivity (EN-DC) in LTE and not in an en-gNB acting as a Secondary Node in Enhanced Dual Connectivity (EN-DC) in LTE. The EN-DC architecture is illustrated in FIG. 3.

In a 5G system, the Multi-RAT (Multiple Radio Access Technology) Dual Connectivity (MR-DC) is a generalization of the Intra-E-UTRA Dual Connectivity (DC) described above and in 36.300 [2], where a multiple Rx/Tx UE may be configured to utilize resources provided by two different nodes connected via non-ideal backhaul, one providing E-UTRA access and the other one providing NR access. One node acts as the MN and the other as the SN. The MN and SN are connected via a network interface and at least the MN is connected to the core network. The MN could be either a gNB or an ng-eNB. The SN could be either a gNB or an ng-eNB.

FIG. 4 illustrates the New RAN architecture and the architecture options 4/4a and 7/a for Dual Connectivity in 5G systems.

In MR-DC, the UE has a single Radio Resource Control RRC state, based on the MN RRC and a single C-plane CP connection towards the Core Network. FIGS. 5A-B illustrate the Control plane architecture for MR-DC. Each radio node has its own RRC entity (E-UTRA version if the node is an ng-eNB or NR version if the node is a gNB) which can generate RRC PDUs to be sent to the UE. More particularly, FIG. 5A illustrates a control plane architecture for EN-DC, and FIG. 5B illustrates a control plane architecture for MR-DC with 5GC (5G Core Network).

Radio Resource Control RRC Protocol Data Units PDUs generated by the SN can be transported via the MN to the UE. The MN always sends the initial SN RRC configuration via MCG SRB (SRB1), but subsequent reconfigurations may be transported via MN or SN. When transporting an RRC Protocol Data Unit PDU from the SN, the MN does not modify the UE configuration provided by the SN.

The 3GPP security group (SA3) is currently finalizing the security specification for the 5G Systems in TS 33.501 [1]. New security features in 5G Systems include the introduction of the integrity protection of the User Plane (UP) and the support for a separate mechanism for the negotiation of the UP security. By negotiation, it is meant the procedure used to determine whether and which of integrity or confidentiality should be activated for a UP session.

By comparison to LTE, there may be no integrity protection for UP and the negotiation of UP confidentiality may be integrated in the activation of the security for the Control Plane (CP) in the Access Stratum (AS) between the eNB and the UE. As described in TS 33.401 [3], the security for the AS CP is activated by a run of the AS Security Mode Command (SMC) procedure which allows the selection of the cryptographic algorithms and the activation of the security for the RRC protocol. Observe that a lower level protocol may actually provide the security, namely the Packet Data Convergence Protocol PDCP protocol in the AS CP protocol stack. Furthermore, since integrity protection of UP is not supported in LTE and confidentiality protection is mandatory, the confidentiality algorithm selected during the AS SMC mentioned above is automatically used for the protection of the UP traffic.

A new feature for the negotiation of UP security in the 5G System may allow the RAN node to receive a UP security policy from the Core Network (CN) during the Packet Data Unit (PDU) Session establishment procedure. This policy is applicable on a PDU Session level. That is, RAN applies the UP security, received from the CN, to all the Data Radio Bearers (DRBs) serving the PDU Session in question. Furthermore, this UP Security policy includes indications on whether to activate either integrity protection or confidentiality protection or both.

This kind of flexibility may be required in the 5G System which is expected to provide connectivity for various types of services and devices. For IoT services, integrity protection may be sufficient while for the usual voice and broadband services, as in LTE, confidentiality protection may also be required. It may thus be difficult to provide dual connectivity using base station nodes having different capabilities (e.g., a 5G node and an LTE node).

SUMMARY

An object of at least some embodiments disclosed herein is for a master gNodeB to handle a user plane security policy so that security activation works as intended for dual connectivity.

An aspect of the invention is a method of operating a Master gNodeB (MgNB) in a radio access network RAN. An indication of a user plane security policy is received from a core network node, wherein the user plane security policy requires user plane integrity protection for a protocol data unit PDU session. A data radio bearer DRB of the PDU session is established directly between the MgNB and a user equipment UE responsive to the user plane security policy requiring user plane integrity protection for the PDU session and responsive to determining that a secondary base station supporting the user plane security policy requiring user plane integrity protection is unavailable.

Another aspect of the invention is a master gNodeB (MgNB) of a radio access network. The MgNB includes a transceiver, a network interface, and a processor. The transceiver is configured to provide wireless network communication with a user equipment UE, and the network interface is configured to provide communication with other nodes of the radio access network. The processor is coupled with the transceiver and the network interface, the processor is configured to provide wireless communication with the UE through the transceiver, and the processor is configured to provide network communication with other nodes of the radio access network through the network interface. The processor is also configured to receive an indication of a user plane security policy from a core network node, wherein the user plane security policy requires user plane integrity protection for a protocol data unit PDU session. In addition, the processor is configured to establish a data radio bearer DRB of the PDU session directly between the MgNB and a user equipment UE responsive to the user plane security policy requiring user plane integrity protection for the PDU session and responsive to determining that a secondary base station supporting the user plane security policy requiring user plane integrity protection is unavailable.

Still another aspect of the invention is a master gNodeB (MgNB) of a radio access network. The MgNB is adapted to receive an indication of a user plane security policy form a core network node, wherein the user plane security policy requires user plane integrity protection for a protocol data unit PDU session. In addition, the MgNB is adapted to establish a data radio bearer DRB of the PDU session directly between the MgNB and a user equipment UE responsive to the user plane security policy requiring user plane integrity protection for the PDU session and responsive to determining that a secondary base station supporting the user plane security policy requiring user plane integrity protection is unavailable.

According to some embodiments of inventive concepts, encryption and integrity protection of bearers may be activated according to a user plane security policy in both master and secondary nodes. Accordingly, efficiency of activation may be improved, ping pong effects may be reduced, and/or failure messages may be reduced.

BRIEF DESCRIPTION OF THE DRAWINGS

The accompanying drawings, which are included to provide a further understanding of the disclosure and are incorporated in a constitute a part of this application, illustrate certain non-limiting embodiments of inventive concepts. In the drawings:

FIG. 1 is a block diagram illustrating non-roaming 5G system architecture in reference point representation;

FIG. 4 is a schematic diagram illustrating a new NG-RAN architecture;

FIG. 6 is a block diagram illustrating a wireless device UE according to some embodiments of inventive concepts;

FIG. 7 is a block diagram illustrating a network node eNB/gNB according to some embodiments of inventive concepts;

FIG. 8 is a flow chart illustrating operations of a master node base station according to some embodiments of inventive concepts;

FIG. 9 is a flow chart illustrating operations of a master gNodeB according to some embodiments of inventive concepts;

DETAILED DESCRIPTION

Figure 2A:
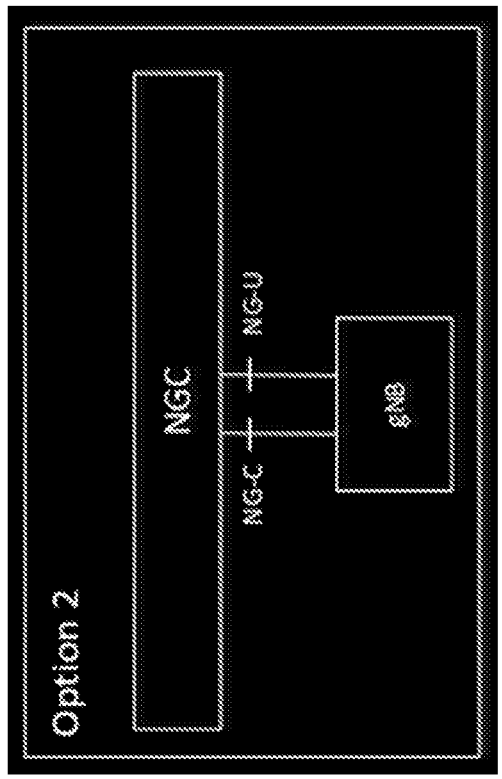
FIGS. 2A-E are block diagrams illustrating architecture options for dual connectivity in 5G systems, including option 4/4A of FIG. 2C and option 7/7A of FIG. 2E.
Figure 2B:
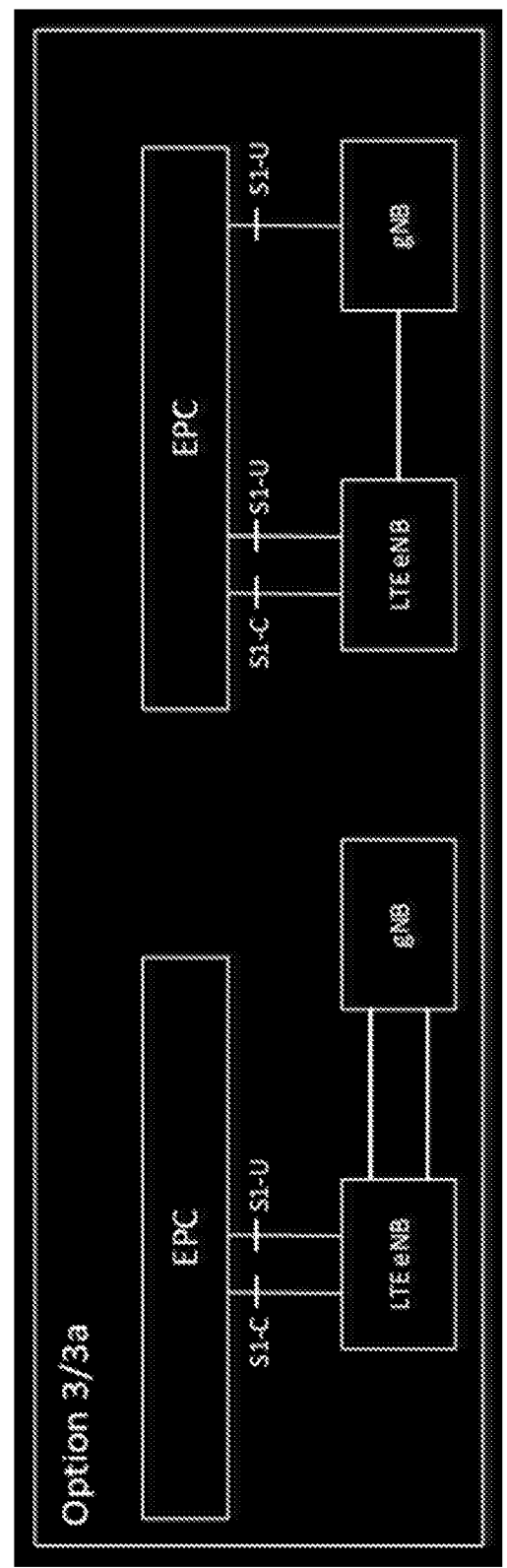
Figure 2C:
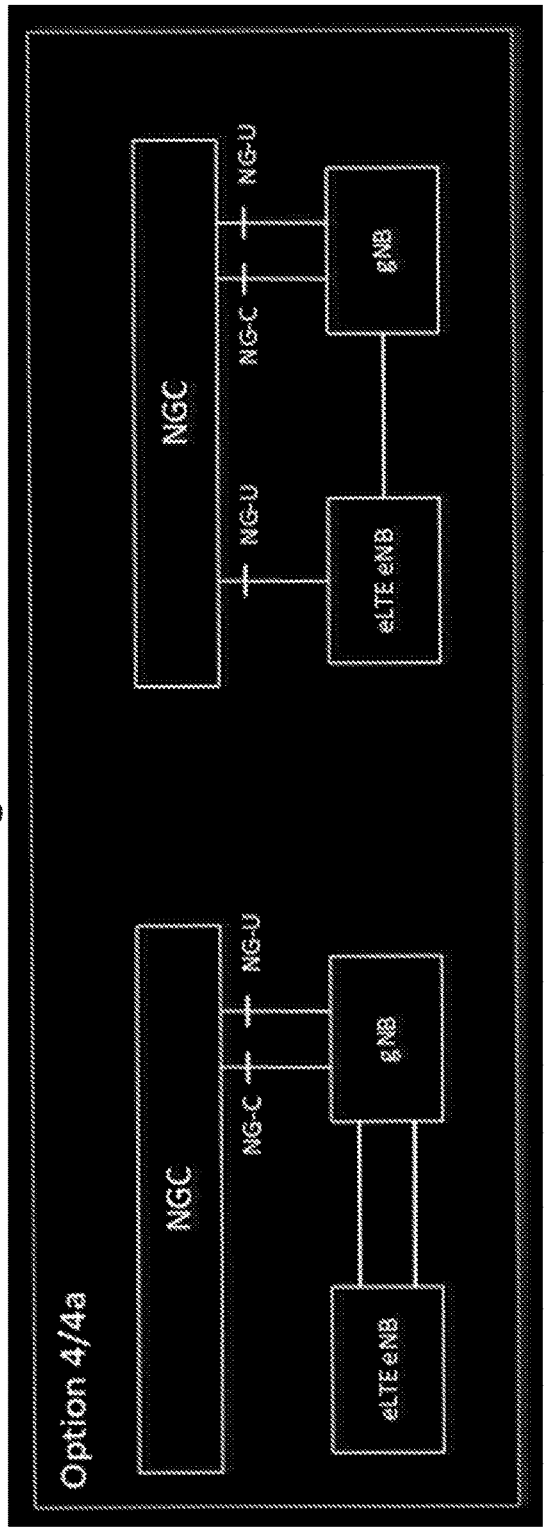
Figure 2D:
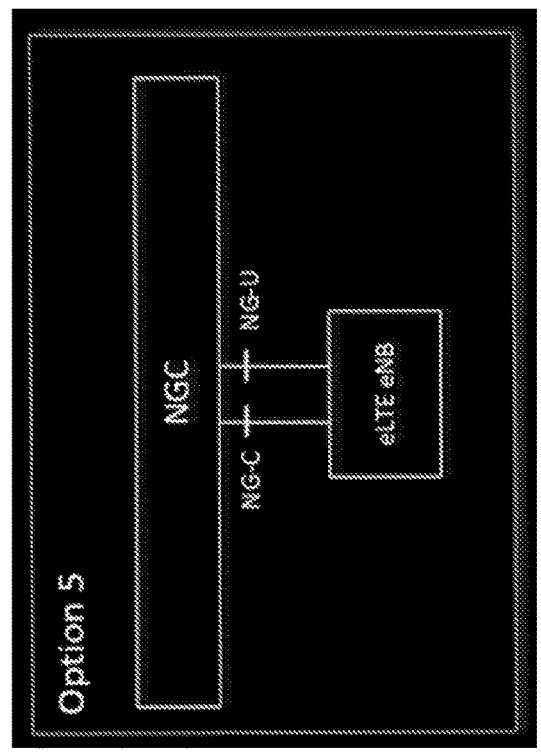
Figure 2E:
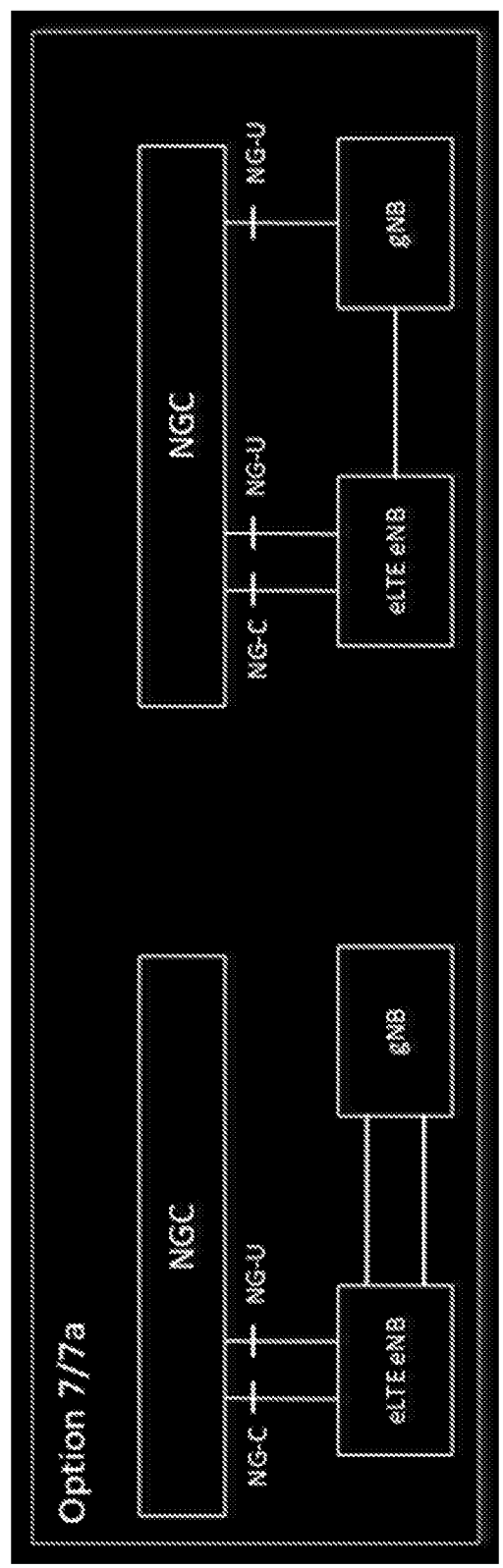
Figure 3:
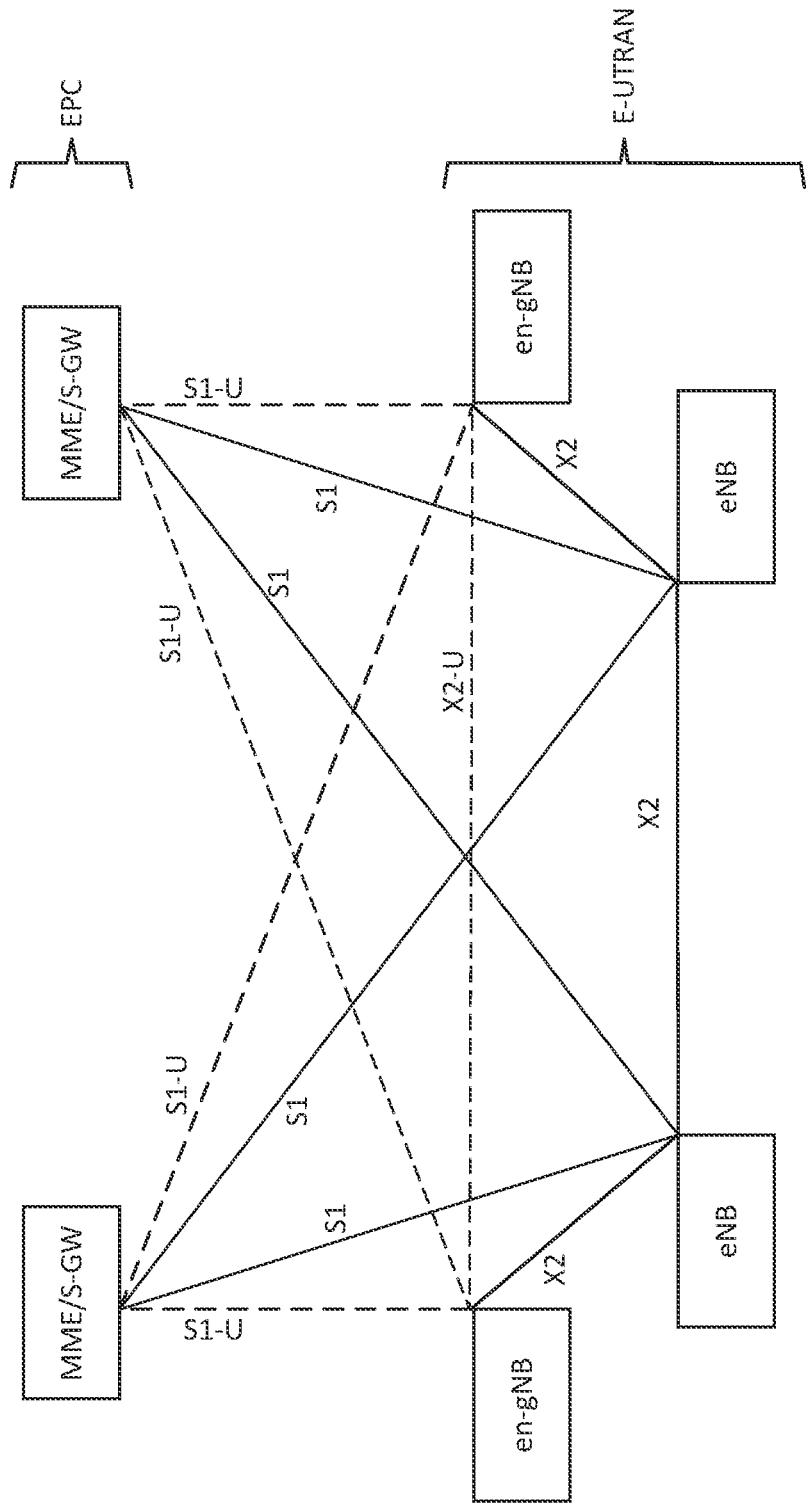
FIG. 3 is a schematic diagram illustrating an EN-DC overall architecture.
Figure 5B:
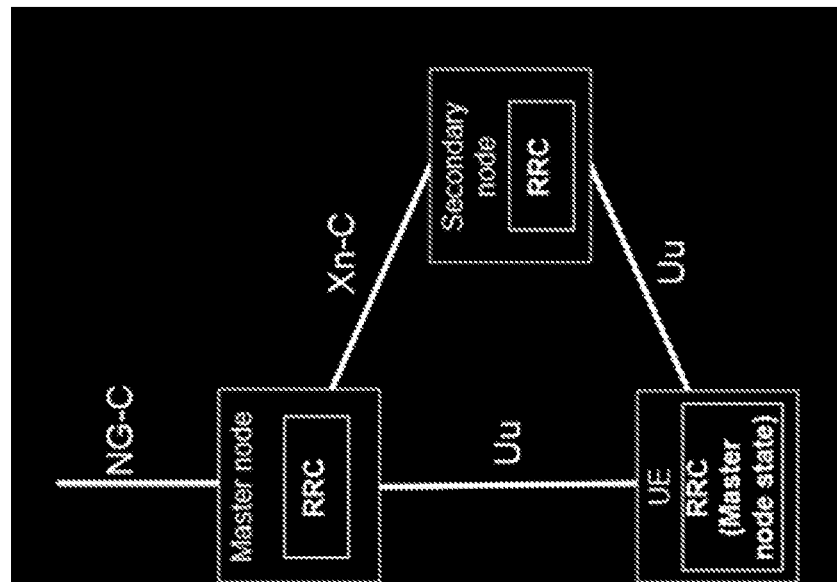
FIGS. 5A and 5B are block diagrams respectively illustrating control plane architectures for EN-DC and for MR-DC with 5GC.
Figure 5A:
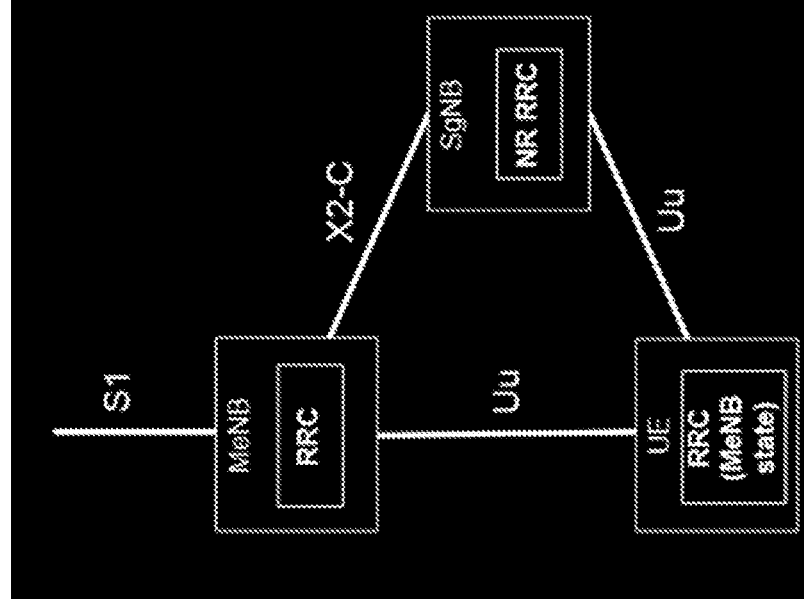

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

The following description presents various embodiments of the disclosed subject matter. These embodiments are presented as teaching examples and are not to be construed as limiting the scope of the disclosed subject matter. For example, certain details of the described embodiments may be modified, omitted, or expanded upon without departing from the scope of the described subject matter.

FIG. 6 is a block diagram illustrating elements of a wireless device UE 4000 (also referred to as a wireless terminal, a wireless communication device, a wireless communication terminal, user equipment, UE, a user equipment node/terminal/device, etc.) configured to provide wireless communication according to embodiments of inventive concepts. As shown, wireless device UE may include an antenna 4007, and a transceiver circuit 4001 (also referred to as a transceiver) including a transmitter and a receiver configured to provide uplink and downlink radio communications with a base station eNB of a wireless communication network (also referred to as a radio access network RAN). Wireless device UE may also include a processor circuit 4003 (also referred to as a processor) coupled to the transceiver circuit, and a memory circuit 4005 (also referred to as memory) coupled to the processor circuit. The memory circuit 4005 may include computer readable program code that when executed by the processor circuit 4003 causes the processor circuit to perform operations according to embodiments disclosed herein. According to other embodiments, processor circuit 4003 may be defined to include memory so that a separate memory circuit is not required. Wireless device UE may also include an interface (such as a user interface) coupled with processor 4003, and/or wireless device UE may be an IoT and/or MTC device.

As discussed herein, operations of wireless device UE may be performed by processor 4003 and/or transceiver 4001. For example, processor 4003 may control transceiver 4001 to transmit uplink communications through transceiver 4001 over a radio interface to a base station eNB of a wireless communication network and/or to receive downlink communications through transceiver 4001 from a base station eNB of the wireless communication network over a radio interface. Moreover, modules may be stored in memory 4005, and these modules may provide instructions so that when instructions of a module are executed by processor 4003, processor 4003 performs respective operations (e.g., operations discussed below with respect to Example Embodiments).

FIG. 7 is a block diagram illustrating elements of a node 5000 (also referred to as a network node, base station, gNB, gNodeB, eNB, eNodeB, etc.) of a wireless communication network (also referred to as a Radio Access Network RAN) configured to provide cellular communication according to embodiments of inventive concepts. As shown, the network node may include a transceiver circuit 5001 (also referred to as a transceiver) including a transmitter and a receiver configured to provide uplink and downlink radio communications with wireless devices. The network node may include a network interface circuit 5007 (also referred to as a network interface) configured to provide communications with other nodes (e.g., with other base stations and/or core network nodes) of the RAN. The network node may also include a processor circuit 5003 (also referred to as a processor) coupled to the transceiver circuit, and a memory circuit 5005 (also referred to as memory) coupled to the processor circuit. The memory circuit 5005 may include computer readable program code that when executed by the processor circuit 5003 causes the processor circuit to perform operations according to embodiments disclosed herein. According to other embodiments, processor circuit 5003 may be defined to include memory so that a separate memory circuit is not required.

As discussed herein, operations of the network node may be performed by processor 5003, network interface 5007, and/or transceiver 5001. For example, processor 5003 may control transceiver 5001 to transmit downlink communications through transceiver 5001 over a radio interface to one or more UEs and/or to receive uplink communications through transceiver 5001 from one or more UEs over a radio interface. Similarly, processor 5003 may control network interface 5007 to transmit communications through network interface 5007 to one or more other network nodes and/or to receive communications through network interface from one or more other network nodes. Moreover, modules may be stored in memory 5005, and these modules may provide instructions so that when instructions of a module are executed by processor 5003, processor 5003 performs respective operations (e.g., operations discussed below with respect to Example Embodiments). A master gNodeB MgNB according to some embodiments of inventive concepts may thus be provided using a network node as shown in FIG. 7.

Currently in 5G systems, an ng-eNB (which is a base station providing LTE radio and connected to a 5G core) acting as a Secondary Node (SN) may not support User Plane UP integrity protection in Rel-15.

This may create a problem when the capabilities of SN and MN are different. For example, with UP integrity protection in the network architecture options Option 4/4a in the 5G systems for Dual Connectivity, UP integrity protection cannot be activated in the Secondary node, even though the UP integrity protection is activated in the Master node. This may occur because in Option 4/4a where a gNB acting as a Master Node, when the MN gNB receives a User Plane Security Policy from the 5G Core Network that requires UP integrity protection to be activated for all DRB's established for a particular PDU session, the Master Node (MN) may activate the UP integrity protection, but when an ng-eNB base station is added as a SN, then UP integrity protection for the bearers in the SN will fail because the ng-eNB does not support UP integrity protection. Another example is Option 7/7a where the UP integrity protection could have been activated for some bearers in SN because it is a gNB. If those bearers are transferred to MN, however, then UP integrity protection activation will fail in Master node, because it is ng-eNB.

According to TS 23.501 [1], the UP Security policy can be set by the Core Network to one of: Required, Preferred or Not Required for encryption and integrity protection respectively. According to some embodiments of inventive concepts, the UP Security Policy may be handled by the Master Node so that security activation works as intended and efficiently in case of Dual Connectivity. According to some embodiments of inventive concepts, security activation may work as intended such that encryption and integrity protection of bearers may be activated according to UP security policy in both the MN and the SN. According to some embodiments of inventive concepts, security activation may work efficiently so that ping pong effects and/or failure messages between the MN and the SN are removed/reduced/avoided.

According to some embodiments of inventive concepts, the Master Node MN may handle the security policy received from the Core Network CN. In the following discussion, embodiments are discussed where the security policy is the user plane UP security policy. Further, the UP security policy indicates that UP integrity protection is required. The MN is a gNB and the SN is a ng-eNB. It should be appreciated that the teachings of the present disclosure are not limited to only those cases, e.g., same could be done for control plane security policy, UP confidentiality, and the same could be done when the MN is a ng-eNB and the SN is a gNB. The same could also apply for both signaling radio bearers (SRB) and data radio bearers (DRB).

If an MN gNB adds an SN ng-eNB, the SN ng-eNB may send some failure/reject message to the MN gNB since the SN ng-eNB does not support UP integrity protection. This situation may be problematic because such failure/reject messages may always happen for SN ng-eNB, causing delays and network congestion. The delay may further increase because the MN gNB may need to perform some additional operations to resolve this situation. If the MN gNB selects yet another SN ng-eNB, the delay/problem may be repeated. Such occurrences may reduce network performance According to some embodiments of inventive concepts, unwanted rejection of PDU Sessions (in case the Secondary Node selected by the Master Node cannot support UP integrity protection) or delay in the setup of the DRB (if the Master Node needs to re-select a different Secondary Node) may be reduced/avoided. Further description follows.

If a UP security policy received by the Master Node (from the Core Network over N2 interface or from another gNB/ng-eNB over Xn interface) indicates that UP integrity protection is Required for a particular PDU Session, then the Master Node utilizes the fact that the MN knows in advance which SN supports UP integrity protection.

Several/alternative methods may be provided for the MN to determine if an SN supports UP integrity protection. For example, The MN may maintain a list of all Secondary Nodes it can offload bearers to together with indication of whether SN supports UP integrity protection or not. For example, the Secondary Node in the list could be a ng-eNB which does not support UP integrity protection. This would be blacklist. Another example is the SN in the list are the gNBs which support UP integrity protection. This would be whitelist. Such a list/lists may be maintained in memory 5005.

If the UP integrity protection is Required, the MN may check the blacklist, and the MN does not select the SN in the blacklist even though otherwise the SN would have been a candidate (e.g., due to better radio conditions between the UE and the SN). In this case, the MN could also check the whitelist and selects the SN only if the whitelist contains that SN.

The MN may keep track of the UP integrity protection support capability of the SNs to which it is connected (e.g. via a whitelist/blacklist as described above). This information could be initially configured by the O&M System, for example, during the connection set up between the MN and the different SNs. The support capability may be defined by the standardization or may be specific to implementations. The information could be static and remain unchanged unless new nodes are introduced, or existing nodes are upgraded.

This information could be also dynamic in the sense that it does change during dual connectivity DC procedures. For example, following a rejection of an offload operation by an SN that does support UP integrity protection due to an offload situation, the MN could update its list by marking the SN in question (e.g., as overloaded). This SN is then down prioritized during the selection of an offload target for a different UE. This mark or tag could be temporary and could be automatically removed following the expiry of a timer or following a successful offload operation of a data radio bearer DRB requiring integrity protection to the tagged SN. Other alternatives may require additional signaling. For example, the tag could be removed following a notification from the tagged SN indicating that it now has resources for the integrity protected DRBs.

There are further cases that could happen which are described below.

If the MN selects a SN supporting UP integrity protection from its list and the Master Node has indicated that UP integrity protection for a DRB offloaded to a SN is Required, but the SN cannot provide UP integrity protection due to exhaustion or misestimation of integrity protection resource usage on the UE, then the SN may reject the SN Addition/Modification procedure to the MN. Responsive to the rejection from the SN, the MN may then select a different SN supporting UP integrity protection from its list.

If the MN is not able to select a Secondary Node which supports UP integrity protection from its list, then it should not attempt to offload a DRB to any Secondary Node. The MN may establish the DRB with UE if it supports UP integrity protection. If the MN does not support UP integrity protection or cannot provide UP integrity protection due to exhaustion or misestimation of integrity protection resource usage on the UE, then the MN rejects the UP Security Policy to the Core Network.

According to some embodiments of inventive concepts, a method may be performed by a master node in a dual connectivity scenario to add a secondary node, and the method may include: obtaining a security policy for radio bearers to be offloaded; obtaining a list of secondary nodes that support the said security policy; selecting the secondary node only if the secondary node supports the said security policy; and adding the secondary node if selected. According to such embodiments: the master node may be a gNB base station or ng-eNB base station; the secondary node may be a gNB base station or a ng-eNB base station; the radio bearers may be signaling radio bearers SRBs or data radio bearers DRBs; the security policy may be for the control plane, the user plane, or both; the list may be a whitelist or a blacklist; and/or the list may be maintained statically or dynamically.

Operations of a master node MN base station are illustrated in the flow chart of FIG. 8 according to some embodiments of inventive concepts. For example, modules may be stored in base station memory 5005 of FIG. 7, and these modules may provide instructions so that when the instructions of a module are executed by processor 5003, processor 5003 performs respective operations of the flow chart of FIG. 8.

Various operations from the flow chart of FIG. 8 may be optional with respect to some embodiments of master node base stations and related methods. Regarding methods of example embodiment 1 (set forth below), for example, operations of blocks 8001, 8003, 8007, 8011, 8013, 8015, 8017, 8019, 8021, 8023, and 8025 of FIG. 8 may be optional. Regarding methods of example embodiment 20 (set forth below), for example, operations of blocks 8001, 8003, 8007, 8009, 8011, 8013, 8015, 8017, 8021, 8023, and 8025 of FIG. 8 may be optional. Regarding methods of example embodiment 22 (set forth below), for example, operations of blocks 8001, 8003, 8007, 8009, 8011, 8013, 8015, 8017, 8019, 8023, and 8025 of FIG. 8 may be optional.

Operations of a Master gNodeB (MgNB) are illustrated in the flow chart of FIG. 9 according to some embodiments of inventive concepts. For example, modules may be stored in base station memory 5005 of FIG. 7, and these modules may provide instructions so that when the instructions of a module are executed by processor 5003, processor 5003 performs respective operations of the flow chart of FIG. 9.

At block 9005, processor 5003 may determine to offload a first data radio bearer DRB of a first protocol data unit PDU for a first UE to a secondary base station (e.g., a gNB or an gn-eNB).

At block 9009, processor 5003 may receive from a core network node (through network interface 5007 over an N2 interface) an indication of a first user plane security policy requiring user plane integrity protection for the first protocol data unit PDU session.

At block 9015, processor 5003 may determine whether a secondary base station is available to offload the first DRB of the first PDU session. Responsive to the first user plane security policy requiring user plane integrity protection for the first PDU session and responsive to determining that a secondary base station supporting the first user plane security policy requiring user plane integrity protection is available for the first UE at block 9015, dual connectivity with the first UE may be provided at block 9025 using the DRB of the first PDU session directly between a secondary base station and the first UE and using another DRB of the first PDU session directly between the MgNB and the first UE. Responsive to the user plane security policy requiring user plane integrity protection for the first PDU session and responsive to determining that a secondary base station supporting the user plane security policy requiring user plane integrity protection is unavailable for the first UE at block 9015, the DRB of the first PDU session may be established directly between the MgNB and the first UE.

Responsive to the first user plane security policy requiring user plane integrity protection for the first PDU session and responsive to determining that a first secondary base station supporting the user plane security policy requiring user plane integrity protection is unavailable at block 9015, processor 5003 may establish a first data radio bearer DRB of the first PDU session directly between the MgNB and a user equipment UE at block 9019. For example, processor 5003 may determine that the first secondary base station that is available to the UE does not support the user plane security policy based on the first secondary base station that is available to the UE being included in a blacklist or based on the first secondary base station that is available to the UE being omitted from a whitelist.

At block 9005, processor 5003 may determine to offload a second data radio bearer DRB of a second protocol data unit PDU for a second UE to a secondary base station (e.g., a gNB or an gn-eNB).

At block 9009, processor 5003 may receive from a core network node (through network interface 5007 over an N2 interface) an indication of a second user plane security policy requiring user plane integrity protection for the second PDU session.

At block 9015, processor 5003 may determine whether a secondary base station is available to offload the second DRB of the second PDU session. Responsive to the second user plane security policy requiring user plane integrity protection for the second PDU session and responsive to determining that a secondary base station supporting the second user plane security policy requiring user plane integrity protection is available for the second UE at block 9015, dual connectivity with the first UE may be provided at block 9025 using the DRB of the second PDU session directly between a secondary base station and the second UE and using another DRB of the second PDU session directly between the MgNB and the second UE. Responsive to the user plane security policy requiring user plane integrity protection for the second PDU session and responsive to determining that a secondary base station supporting the user plane security policy requiring user plane integrity protection is unavailable for the second UE at block 9015, the DRB of the second PDU session may be established directly between the MgNB and the second UE.

Responsive to the first user plane security policy requiring user plane integrity protection for the first PDU session and responsive to determining that a first secondary base station supporting the user plane security policy requiring user plane integrity protection is unavailable at block 9015, processor 5003 may establish a first data radio bearer DRB of the first PDU session directly between the MgNB and a user equipment UE at block 9019. For example, processor 5003 may determine that the first secondary base station that is available to the first UE does not support the first user plane security policy based on the first secondary base station that is available to the first UE being included in a blacklist or based on the first secondary base station that is available to the first UE being omitted from a whitelist.

Responsive to the second user plane security policy requiring user plane integrity protection for the second PDU session and responsive to determining that a second secondary base station supporting the second user plane security policy requiring user plane integrity protection is available for the second UE, processor 5003 may provide dual connectivity with the second UE using a second DRB of the second PDU session directly between the second secondary base station and the UE and using a third DRB of the second PDU session directly between the MgNB and the second UE at block 9025. For example, processor 5003 may determine that the second secondary base station that is available to the second UE does support the second user plane security policy based on the second secondary base station that is available to the second UE being omitted from a blacklist or based on the second secondary base station that is available to the second UE being included in a whitelist.

Various operations from the flow chart of FIG. 9 may be optional with respect to some embodiments of master node base stations and related methods. Regarding methods of some embodiments, for example, operations of blocks 9005, 9015, and 9025 of FIG. 9 may be optional.

Example embodiments of inventive concepts are set forth below.

1. A method of operating a master node, MN, in a radio access network, RAN, the method comprising: determining (8005) a security policy for a radio bearer to be offloaded; and selecting (8009) a secondary node, SN, for the radio bearer to be offloaded based on the security policy.

2. The method of Embodiment 1, further comprising: adding (8013) the secondary node, SN, for the radio bearer to be offloaded responsive to selecting the secondary node.

3. The method of any of Embodiments 1-2, wherein the radio bearer to be offloaded is a second radio bearer, the method further comprising: providing (8015) dual connectivity communication with a wireless device (UE) using a first radio bearer between the master node and the wireless device and using the second radio bearer between the secondary node and the wireless device.

4. The method of any of Embodiments 1-2, wherein the radio bearer to be offloaded is a second radio bearer, and wherein adding the secondary node comprises providing dual connectivity communication with a wireless device (UE) using a first radio bearer between the master node and the wireless device and using the second radio bearer between the secondary node and the wireless device.

5. The method of and of Embodiments 3-4, wherein providing dual connectivity communication comprises transmitting a first communication from the master node to the wireless device using the first radio bearer and transmitting a second communication from the master node to the wireless device using the secondary node and the second radio bearer.

6. The method of and of Embodiments 3-4, wherein providing dual connectivity communication comprises transmitting a communication from the master node to the wireless device using the first radio bearer and transmitting the communication from the master node to the wireless device using the secondary node and the second radio bearer.

7. The method of any of Embodiments 3-4, wherein providing dual connectivity communication comprises receiving a first communication at the master node from the wireless device using the first radio bearer and receiving a second communication at the master node from the wireless device using the secondary node and the second radio bearer.

8. The method of any of Embodiments 3-4, wherein providing dual connectivity communication comprises receiving a communication at the master node from the wireless device using the first radio bearer and receiving the communication at the master node from the wireless device using the secondary node and the second radio bearer.

9. The method of any of Embodiments 3-8, wherein the first radio bearer is provided over a first radio interface directly between the wireless device and the master node, and wherein the second radio bearer is provided over a second radio interface directly between the wireless device and the secondary node.

10. The method of any of Embodiments 1-9, wherein selecting the secondary node comprises selecting the secondary node based on the security policy and based on a list including information regarding support of the security policy for each of a plurality of candidate secondary nodes.

11. The method of Embodiment 10, wherein the list comprises a whitelist identifying a plurality of candidate secondary nodes that do support the security policy, and wherein selecting the secondary node comprises selecting the secondary node SN based on the secondary node SN being included in the whitelist of candidate secondary nodes that do support the security policy.

12. The method of any of Embodiments 10-11, wherein the list comprises a blacklist identifying a plurality of candidate secondary nodes that do not support the security policy, and wherein selecting the secondary node comprises selecting the secondary node SN based on the secondary node SN not being included in the blacklist of candidate secondary nodes that do not support the security policy.

13. The method of any of Embodiments 10-12 further comprising: providing (8003) the list based on information received from another node of the radio access network.

14. The method of Embodiment 13, wherein the other node comprises at least one of a core network node and/or an Operation and Maintenance, O&M, system node.

15. The method of Embodiment 1, wherein the secondary node is a first secondary node, the method further comprising: responsive to receiving a rejection notification from the first secondary node, selecting (8009) a second secondary node for the radio bearer to be offloaded based on the security policy; and responsive to receiving an acceptance notification from the second secondary node, adding (8013) the second secondary node for the radio bearer to be offloaded responsive to selecting the second secondary node.

16. The method of Embodiment 15, wherein the radio bearer to be offloaded is a second radio bearer, the method further comprising: providing (8015) dual connectivity communication with a wireless device (UE) using a first radio bearer between the master node and the wireless device and using the second radio bearer between the second secondary node and the wireless device.

17. The method of Embodiment 15, wherein the radio bearer to be offloaded is a second radio bearer, and wherein adding the second secondary node comprises providing dual connectivity communication with a wireless device (UE) using a first radio bearer between the master node and the wireless device and using the second radio bearer between the second secondary node and the wireless device.

18. The method of any of Embodiments 15-17 further comprising: responsive to receiving the rejection notification, adding (8023) the first secondary node to a blacklist for radio bearer offloading.

19. The method of Embodiment 18 further comprising: starting (8025) a timer for the first secondary node responsive to receiving the rejection notification; and removing the first secondary node from the blacklist responsive to expiration of the timer.

20. A method of operating a master node, MN, in a radio access network, RAN, the method comprising: determining (8005) a security policy for a radio bearer to be offloaded; and responsive to determining that a secondary node supporting the security policy is unavailable, establishing (8019) the radio bearer between the master node and a wireless device (UE).

21. The method of Embodiment 20, wherein establishing the radio bearer comprises establishing the radio bearer responsive to determining that a secondary node supporting the security policy is unavailable and responsive to determining that that the master node supports the security policy for the radio bearer to be offloaded.

22. A method of operating a master node, MN, in a radio access network, RAN, the method comprising: determining (8005) a security policy for a radio bearer to be offloaded; and responsive to determining that a secondary node supporting the security policy is unavailable and responsive to determining that the master node does not support the security policy for the radio bearer to be offloaded, transmitting (8021) a rejection of the security policy to a core network node.

23. The method of any of Embodiments 1-22, wherein the master node is a master node base station, and wherein the secondary node is a secondary node base station.

24. The method of Embodiment 23, wherein the master node base station comprises at least one of a gNB base station and/or an ng-eNB base station.

25. The method of any of Embodiments 23-24, wherein the secondary node base station comprises at least one of a gNB base station and/or an ng-eNB base station.

26. The method of any of Embodiments 1-25, wherein the radio bearer comprises at least one of a signaling radio bearer, SRB, and/or a data radio bearer, DRB.

27. The method of any of Embodiments 1-26, wherein the security policy comprises at least one of a control plane, CP, security policy and/or a user plane, UP, security policy.

28. The method of any of Embodiments 1-27, wherein determining the security policy comprises receiving an indication of the security policy from a core network node.

29. The method of Embodiment 28, wherein the indication of the security policy is received from the core network node over an N2 interface.

30. The method of any of Embodiments 1-27, wherein determining the security policy comprises receiving the security policy from a RAN node.

31. The method of Embodiment 30, wherein receiving the security policy comprises receiving the security policy from the RAN node over an Xn interface.

32. The method of any of Embodiments 30-31, wherein the RAN node comprises at least one of a gNB base station and/or an ng-eNB base station.

33. A master node, MN, of a radio access network, the master node comprising: a transceiver (5001) configured to provide wireless network communication with a wireless device (UE); a network interface (5007) configured to provide communication with other nodes of the radio access network; and a processor (5003) coupled with the transceiver and the network interface, wherein the processor is configured to provide wireless communication with the wireless device through the transceiver, wherein the processor is configured to provide network communication with other nodes of the radio access network through the network interface, and wherein the processor is configured to perform operations according to any of Embodiments 1-32.

34. A master node, MN, of a radio access network, wherein the master node is adapted to perform according to any of Embodiments 1-32.

Citations for some references are provided below.

[1] 3GPP TS 23.501 V15.1.0 (2018-March), Technical Specification Group Services and System Aspects; System Architecture for the 5G System; Stage 2 (Release 15).

[2] 3GPP TS 36.300 V15.1.0 (2018-March), Technical Specification Group Radio Access Network; Evolved Universal Terrestrial Radio Access (E-UTRA) and Evolved Universal Terrestrial Radio Access Network (E-UTRAN); Overall description; Stage 2 (Release 15).

[3] 3GPP TS 33.401 V15.3.0 (2018-March), Technical Specification Group Services and System Aspects; 3GPP System Architecture Evolution (SAE); Security architecture (Release 15).

[4] 3GPP TS 33.501 V15.0.0 (2018-March), Technical Specification Group Services and System Aspects; Security architecture and procedures for 5G system (Release 15).

[5] 3GPP TS 37.340 V15.1.0 (2018-March), Technical Specification Group Radio Access Network; Evolved Universal Terrestrial Radio Access (E-UTRA) and NR; Multi-connectivity; Stage 2 (Release 15).

Further definitions and embodiments are discussed below.

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belong. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the examples of embodiments and claims and their equivalents, and shall not be restricted or limited by the foregoing detailed description.

Additional explanation is provided below.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Figure 10:
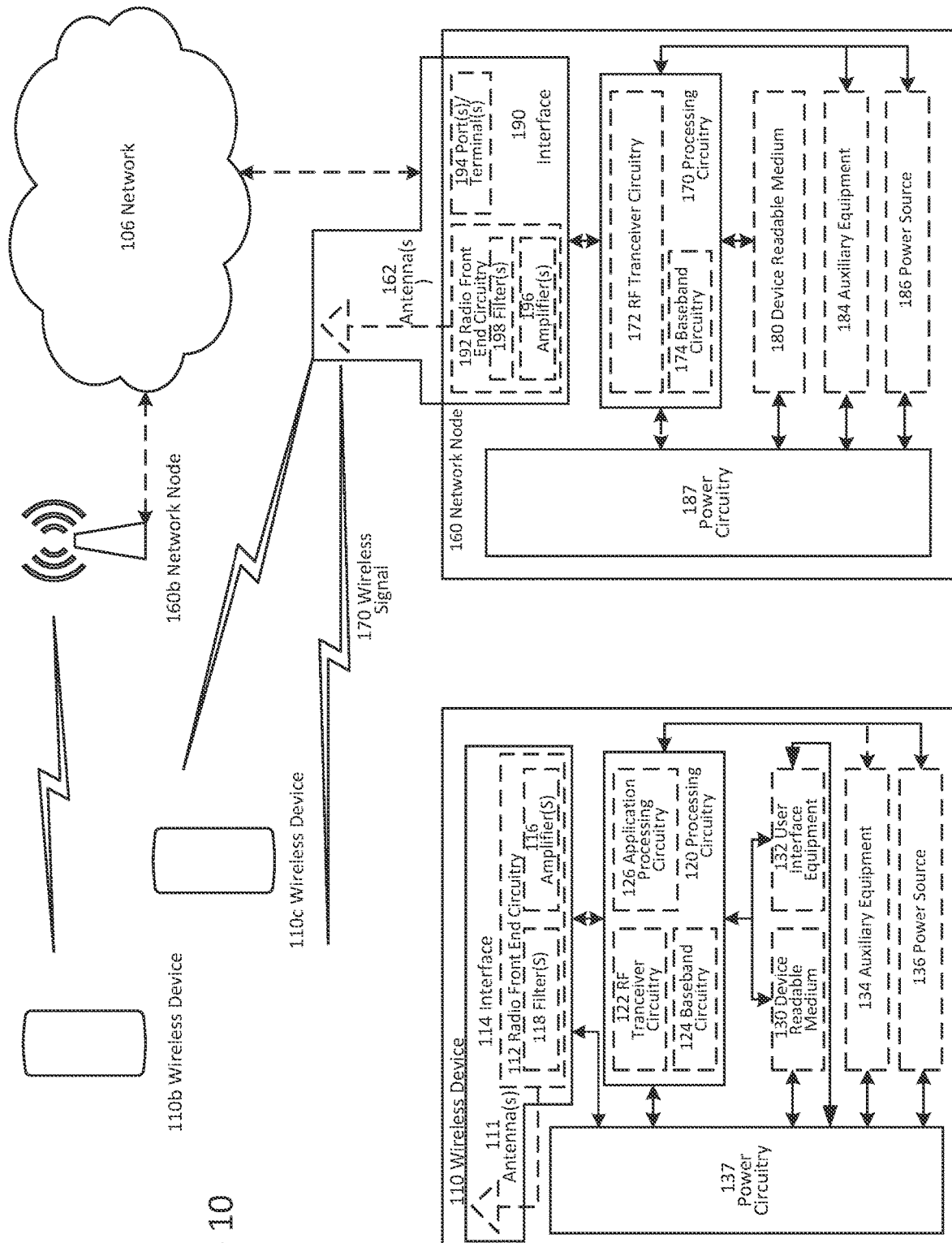
FIG. 10 is a block diagram of a wireless network in accordance with some embodiments.

FIG. 10: A wireless network in accordance with some embodiments.

Although the subject matter described herein may be implemented in any appropriate type of system using any suitable components, the embodiments disclosed herein are described in relation to a wireless network, such as the example wireless network illustrated in FIG. 10. For simplicity, the wireless network of FIG. 10 only depicts network 106, network nodes 160 and 160b, and WDs 110, 110b, and 110c (also referred to as mobile terminals). In practice, a wireless network may further include any additional elements suitable to support communication between wireless devices or between a wireless device and another communication device, such as a landline telephone, a service provider, or any other network node or end device. Of the illustrated components, network node 160 and wireless device (WD) 110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 160 and WD 110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 10, network node 160 includes processing circuitry 170, device readable medium 180, interface 190, auxiliary equipment 184, power source 186, power circuitry 187, and antenna 162. Although network node 160 illustrated in the example wireless network of FIG. 10 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 160 are depicted as single boxes located within a larger box, or nested within multiple boxes, in practice, a network node may comprise multiple different physical components that make up a single illustrated component (e.g., device readable medium 180 may comprise multiple separate hard drives as well as multiple RAM modules).

Similarly, network node 160 may be composed of multiple physically separate components (e.g., a NodeB component and a RNC component, or a BTS component and a BSC component, etc.), which may each have their own respective components. In certain scenarios in which network node 160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 160 may be configured to support multiple radio access technologies (RATs). In such embodiments, some components may be duplicated (e.g., separate device readable medium 180 for the different RATs) and some components may be reused (e.g., the same antenna 162 may be shared by the RATs). Network node 160 may also include multiple sets of the various illustrated components for different wireless technologies integrated into network node 160, such as, for example, GSM, WCDMA, LTE, NR, WiFi, or Bluetooth wireless technologies. These wireless technologies may be integrated into the same or different chip or set of chips and other components within network node 160.

Processing circuitry 170 is configured to perform any determining, calculating, or similar operations (e.g., certain obtaining operations) described herein as being provided by a network node. These operations performed by processing circuitry 170 may include processing information obtained by processing circuitry 170 by, for example, converting the obtained information into other information, comparing the obtained information or converted information to information stored in the network node, and/or performing one or more operations based on the obtained information or converted information, and as a result of said processing making a determination.

Processing circuitry 170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 160 components, such as device readable medium 180, network node 160 functionality. For example, processing circuitry 170 may execute instructions stored in device readable medium 180 or in memory within processing circuitry 170. Such functionality may include providing any of the various wireless features, functions, or benefits discussed herein. In some embodiments, processing circuitry 170 may include a system on a chip (SOC).

In some embodiments, processing circuitry 170 may include one or more of radio frequency (RF) transceiver circuitry 172 and baseband processing circuitry 174. In some embodiments, radio frequency (RF) transceiver circuitry 172 and baseband processing circuitry 174 may be on separate chips (or sets of chips), boards, or units, such as radio units and digital units. In alternative embodiments, part or all of RF transceiver circuitry 172 and baseband processing circuitry 174 may be on the same chip or set of chips, boards, or units.

In certain embodiments, some or all of the functionality described herein as being provided by a network node, base station, eNB or other such network device may be performed by processing circuitry 170 executing instructions stored on device readable medium 180 or memory within processing circuitry 170. In alternative embodiments, some or all of the functionality may be provided by processing circuitry 170 without executing instructions stored on a separate or discrete device readable medium, such as in a hard-wired manner In any of those embodiments, whether executing instructions stored on a device readable storage medium or not, processing circuitry 170 can be configured to perform the described functionality. The benefits provided by such functionality are not limited to processing circuitry 170 alone or to other components of network node 160, but are enjoyed by network node 160 as a whole, and/or by end users and the wireless network generally.

Device readable medium 180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 170. Device readable medium 180 may store any suitable instructions, data or information, including a computer program, software, an application including one or more of logic, rules, code, tables, etc. and/or other instructions capable of being executed by processing circuitry 170 and, utilized by network node 160. Device readable medium 180 may be used to store any calculations made by processing circuitry 170 and/or any data received via interface 190. In some embodiments, processing circuitry 170 and device readable medium 180 may be considered to be integrated.

Interface 190 is used in the wired or wireless communication of signalling and/or data between network node 160, network 106, and/or WDs 110. As illustrated, interface 190 comprises port(s)/terminal(s) 194 to send and receive data, for example to and from network 106 over a wired connection. Interface 190 also includes radio front end circuitry 192 that may be coupled to, or in certain embodiments a part of, antenna 162. Radio front end circuitry 192 comprises filters 198 and amplifiers 196. Radio front end circuitry 192 may be connected to antenna 162 and processing circuitry 170. Radio front end circuitry may be configured to condition signals communicated between antenna 162 and processing circuitry 170. Radio front end circuitry 192 may receive digital data that is to be sent out to other network nodes or WDs via a wireless connection. Radio front end circuitry 192 may convert the digital data into a radio signal having the appropriate channel and bandwidth parameters using a combination of filters 198 and/or amplifiers 196. The radio signal may then be transmitted via antenna 162. Similarly, when receiving data, antenna 162 may collect radio signals which are then converted into digital data by radio front end circuitry 192. The digital data may be passed to processing circuitry 170. In other embodiments, the interface may comprise different components and/or different combinations of components.

In certain alternative embodiments, network node 160 may not include separate radio front end circuitry 192, instead, processing circuitry 170 may comprise radio front end circuitry and may be connected to antenna 162 without separate radio front end circuitry 192. Similarly, in some embodiments, all or some of RF transceiver circuitry 172 may be considered a part of interface 190. In still other embodiments, interface 190 may include one or more ports or terminals 194, radio front end circuitry 192, and RF transceiver circuitry 172, as part of a radio unit (not shown), and interface 190 may communicate with baseband processing circuitry 174, which is part of a digital unit (not shown).

Antenna 162 may include one or more antennas, or antenna arrays, configured to send and/or receive wireless signals. Antenna 162 may be coupled to radio front end circuitry 190 and may be any type of antenna capable of transmitting and receiving data and/or signals wirelessly. In some embodiments, antenna 162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 162 may be separate from network node 160 and may be connectable to network node 160 through an interface or port.

Antenna 162, interface 190, and/or processing circuitry 170 may be configured to perform any receiving operations and/or certain obtaining operations described herein as being performed by a network node. Any information, data and/or signals may be received from a wireless device, another network node and/or any other network equipment. Similarly, antenna 162, interface 190, and/or processing circuitry 170 may be configured to perform any transmitting operations described herein as being performed by a network node. Any information, data and/or signals may be transmitted to a wireless device, another network node and/or any other network equipment.

Power circuitry 187 may comprise, or be coupled to, power management circuitry and is configured to supply the components of network node 160 with power for performing the functionality described herein. Power circuitry 187 may receive power from power source 186. Power source 186 and/or power circuitry 187 may be configured to provide power to the various components of network node 160 in a form suitable for the respective components (e.g., at a voltage and current level needed for each respective component). Power source 186 may either be included in, or external to, power circuitry 187 and/or network node 160. For example, network node 160 may be connectable to an external power source (e.g., an electricity outlet) via an input circuitry or interface such as an electrical cable, whereby the external power source supplies power to power circuitry 187. As a further example, power source 186 may comprise a source of power in the form of a battery or battery pack which is connected to, or integrated in, power circuitry 187. The battery may provide backup power should the external power source fail. Other types of power sources, such as photovoltaic devices, may also be used.

Alternative embodiments of network node 160 may include additional components beyond those shown in FIG. 10 that may be responsible for providing certain aspects of the network node's functionality, including any of the functionality described herein and/or any functionality necessary to support the subject matter described herein. For example, network node 160 may include user interface equipment to allow input of information into network node 160 and to allow output of information from network node 160. This may allow a user to perform diagnostic, maintenance, repair, and other administrative functions for network node 160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 110 includes antenna 111, interface 114, processing circuitry 120, device readable medium 130, user interface equipment 132, auxiliary equipment 134, power source 136 and power circuitry 137. WD 110 may include multiple sets of one or more of the illustrated components for different wireless technologies supported by WD 110, such as, for example, GSM, WCDMA, LTE, NR, WiFi, WiMAX, or Bluetooth wireless technologies, just to mention a few. These wireless technologies may be integrated into the same or different chips or set of chips as other components within WD 110.

Antenna 111 may include one or more antennas or antenna arrays, configured to send and/or receive wireless signals, and is connected to interface 114. In certain alternative embodiments, antenna 111 may be separate from WD 110 and be connectable to WD 110 through an interface or port. Antenna 111, interface 114, and/or processing circuitry 120 may be configured to perform any receiving or transmitting operations described herein as being performed by a WD. Any information, data and/or signals may be received from a network node and/or another WD. In some embodiments, radio front end circuitry and/or antenna 111 may be considered an interface.

As illustrated, interface 114 comprises radio front end circuitry 112 and antenna 111. Radio front end circuitry 112 comprise one or more filters 118 and amplifiers 116. Radio front end circuitry 114 is connected to antenna 111 and processing circuitry 120, and is configured to condition signals communicated between antenna 111 and processing circuitry 120. Radio front end circuitry 112 may be coupled to or a part of antenna 111. In some embodiments, WD 110 may not include separate radio front end circuitry 112; rather, processing circuitry 120 may comprise radio front end circuitry and may be connected to antenna 111. Similarly, in some embodiments, some or all of RF transceiver circuitry 122 may be considered a part of interface 114. Radio front end circuitry 112 may receive digital data that is to be sent out to other network nodes or WDs via a wireless connection. Radio front end circuitry 112 may convert the digital data into a radio signal having the appropriate channel and bandwidth parameters using a combination of filters 118 and/or amplifiers 116. The radio signal may then be transmitted via antenna 111. Similarly, when receiving data, antenna 111 may collect radio signals which are then converted into digital data by radio front end circuitry 112. The digital data may be passed to processing circuitry 120. In other embodiments, the interface may comprise different components and/or different combinations of components.

Processing circuitry 120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 110 components, such as device readable medium 130, WD 110 functionality. Such functionality may include providing any of the various wireless features or benefits discussed herein. For example, processing circuitry 120 may execute instructions stored in device readable medium 130 or in memory within processing circuitry 120 to provide the functionality disclosed herein.

As illustrated, processing circuitry 120 includes one or more of RF transceiver circuitry 122, baseband processing circuitry 124, and application processing circuitry 126. In other embodiments, the processing circuitry may comprise different components and/or different combinations of components. In certain embodiments processing circuitry 120 of WD 110 may comprise a SOC. In some embodiments, RF transceiver circuitry 122, baseband processing circuitry 124, and application processing circuitry 126 may be on separate chips or sets of chips. In alternative embodiments, part or all of baseband processing circuitry 124 and application processing circuitry 126 may be combined into one chip or set of chips, and RF transceiver circuitry 122 may be on a separate chip or set of chips. In still alternative embodiments, part or all of RF transceiver circuitry 122 and baseband processing circuitry 124 may be on the same chip or set of chips, and application processing circuitry 126 may be on a separate chip or set of chips. In yet other alternative embodiments, part or all of RF transceiver circuitry 122, baseband processing circuitry 124, and application processing circuitry 126 may be combined in the same chip or set of chips. In some embodiments, RF transceiver circuitry 122 may be a part of interface 114. RF transceiver circuitry 122 may condition RF signals for processing circuitry 120.

In certain embodiments, some or all of the functionality described herein as being performed by a WD may be provided by processing circuitry 120 executing instructions stored on device readable medium 130, which in certain embodiments may be a computer-readable storage medium. In alternative embodiments, some or all of the functionality may be provided by processing circuitry 120 without executing instructions stored on a separate or discrete device readable storage medium, such as in a hard-wired manner In any of those particular embodiments, whether executing instructions stored on a device readable storage medium or not, processing circuitry 120 can be configured to perform the described functionality. The benefits provided by such functionality are not limited to processing circuitry 120 alone or to other components of WD 110, but are enjoyed by WD 110 as a whole, and/or by end users and the wireless network generally.

Processing circuitry 120 may be configured to perform any determining, calculating, or similar operations (e.g., certain obtaining operations) described herein as being performed by a WD. These operations, as performed by processing circuitry 120, may include processing information obtained by processing circuitry 120 by, for example, converting the obtained information into other information, comparing the obtained information or converted information to information stored by WD 110, and/or performing one or more operations based on the obtained information or converted information, and as a result of said processing making a determination.

Device readable medium 130 may be operable to store a computer program, software, an application including one or more of logic, rules, code, tables, etc. and/or other instructions capable of being executed by processing circuitry 120. Device readable medium 130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 120. In some embodiments, processing circuitry 120 and device readable medium 130 may be considered to be integrated. User interface equipment 132 may provide components that allow for a human user to interact with WD 110. Such interaction may be of many forms, such as visual, audial, tactile, etc. User interface equipment 132 may be operable to produce output to the user and to allow the user to provide input to WD 110. The type of interaction may vary depending on the type of user interface equipment 132 installed in WD 110. For example, if WD 110 is a smart phone, the interaction may be via a touch screen; if WD 110 is a smart meter, the interaction may be through a screen that provides usage (e.g., the number of gallons used) or a speaker that provides an audible alert (e.g., if smoke is detected). User interface equipment 132 may include input interfaces, devices and circuits, and output interfaces, devices and circuits. User interface equipment 132 is configured to allow input of information into WD 110, and is connected to processing circuitry 120 to allow processing circuitry 120 to process the input information. User interface equipment 132 may include, for example, a microphone, a proximity or other sensor, keys/buttons, a touch display, one or more cameras, a USB port, or other input circuitry. User interface equipment 132 is also configured to allow output of information from WD 110, and to allow processing circuitry 120 to output information from WD 110. User interface equipment 132 may include, for example, a speaker, a display, vibrating circuitry, a USB port, a headphone interface, or other output circuitry. Using one or more input and output interfaces, devices, and circuits, of user interface equipment 132, WD 110 may communicate with end users and/or the wireless network, and allow them to benefit from the functionality described herein.

Auxiliary equipment 134 is operable to provide more specific functionality which may not be generally performed by WDs. This may comprise specialized sensors for doing measurements for various purposes, interfaces for additional types of communication such as wired communications etc. The inclusion and type of components of auxiliary equipment 134 may vary depending on the embodiment and/or scenario.

Power source 136 may, in some embodiments, be in the form of a battery or battery pack. Other types of power sources, such as an external power source (e.g., an electricity outlet), photovoltaic devices or power cells, may also be used. WD 110 may further comprise power circuitry 137 for delivering power from power source 136 to the various parts of WD 110 which need power from power source 136 to carry out any functionality described or indicated herein. Power circuitry 137 may in certain embodiments comprise power management circuitry. Power circuitry 137 may additionally or alternatively be operable to receive power from an external power source; in which case WD 110 may be connectable to the external power source (such as an electricity outlet) via input circuitry or an interface such as an electrical power cable. Power circuitry 137 may also in certain embodiments be operable to deliver power from an external power source to power source 136. This may be, for example, for the charging of power source 136. Power circuitry 137 may perform any formatting, converting, or other modification to the power from power source 136 to make the power suitable for the respective components of WD 110 to which power is supplied.

Figure 11:
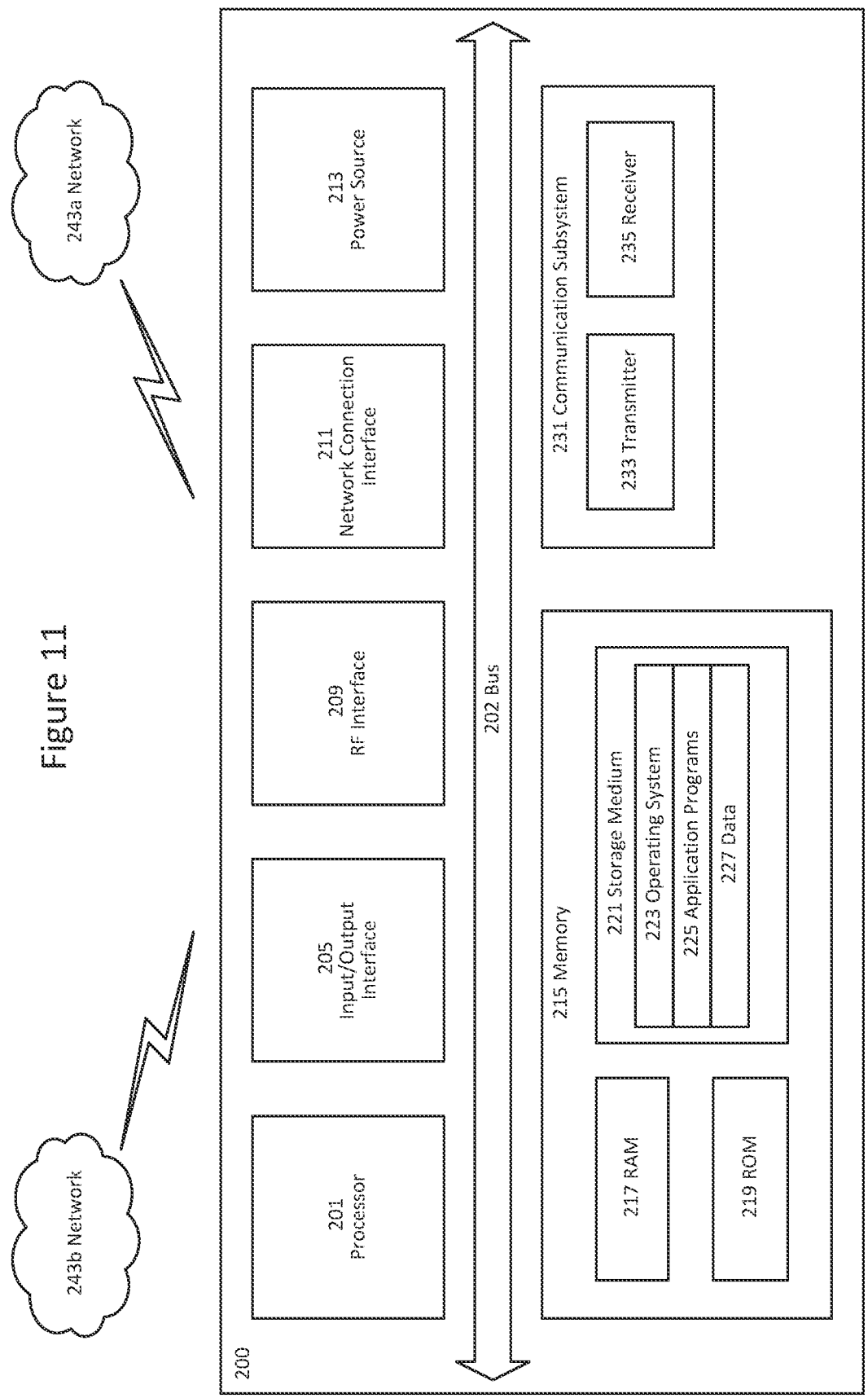
FIG. 11 is a block diagram of a user equipment in accordance with some embodiments

FIG. 11: User Equipment in accordance with some embodiments FIG. 11 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 2200 may be any UE identified by the 3rd Generation Partnership Project (3GPP), including a NB-IoT UE, a machine type communication (MTC) UE, and/or an enhanced MTC (eMTC) UE. UE 200, as illustrated in FIG. 11, is one example of a WD configured for communication in accordance with one or more communication standards promulgated by the 3rd Generation Partnership Project (3GPP), such as 3GPP's GSM, UMTS, LTE, and/or 5G standards. As mentioned previously, the term WD and UE may be used interchangeable. Accordingly, although FIG. 11 is a UE, the components discussed herein are equally applicable to a WD, and vice-versa.

In FIG. 11, UE 200 includes processing circuitry 201 that is operatively coupled to input/output interface 205, radio frequency (RF) interface 209, network connection interface 211, memory 215 including random access memory (RAM) 217, read-only memory (ROM) 219, and storage medium 221 or the like, communication subsystem 231, power source 233, and/or any other component, or any combination thereof. Storage medium 221 includes operating system 223, application program 225, and data 227. In other embodiments, storage medium 221 may include other similar types of information. Certain UEs may utilize all of the components shown in FIG. 11, or only a subset of the components. The level of integration between the components may vary from one UE to another UE. Further, certain UEs may contain multiple instances of a component, such as multiple processors, memories, transceivers, transmitters, receivers, etc.

In FIG. 11, processing circuitry 201 may be configured to process computer instructions and data. Processing circuitry 201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 201 may include two central processing units (CPUs). Data may be information in a form suitable for use by a computer.

In the depicted embodiment, input/output interface 205 may be configured to provide a communication interface to an input device, output device, or input and output device. UE 200 may be configured to use an output device via input/output interface 205. An output device may use the same type of interface port as an input device. For example, a USB port may be used to provide input to and output from UE 200. The output device may be a speaker, a sound card, a video card, a display, a monitor, a printer, an actuator, an emitter, a smartcard, another output device, or any combination thereof. UE 200 may be configured to use an input device via input/output interface 205 to allow a user to capture information into UE 200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 11, RF interface 209 may be configured to provide a communication interface to RF components such as a transmitter, a receiver, and an antenna. Network connection interface 211 may be configured to provide a communication interface to network 243a. Network 243a may encompass wired and/or wireless networks such as a local-area network (LAN), a wide-area network (WAN), a computer network, a wireless network, a telecommunications network, another like network or any combination thereof. For example, network 243a may comprise a Wi-Fi network. Network connection interface 211 may be configured to include a receiver and a transmitter interface used to communicate with one or more other devices over a communication network according to one or more communication protocols, such as Ethernet, TCP/IP, SONET, ATM, or the like. Network connection interface 211 may implement receiver and transmitter functionality appropriate to the communication network links (e.g., optical, electrical, and the like). The transmitter and receiver functions may share circuit components, software or firmware, or alternatively may be implemented separately.

RAM 217 may be configured to interface via bus 202 to processing circuitry 201 to provide storage or caching of data or computer instructions during the execution of software programs such as the operating system, application programs, and device drivers. ROM 219 may be configured to provide computer instructions or data to processing circuitry 201. For example, ROM 219 may be configured to store invariant low-level system code or data for basic system functions such as basic input and output (I/O), startup, or reception of keystrokes from a keyboard that are stored in a non-volatile memory. Storage medium 221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 221 may be configured to include operating system 223, application program 225 such as a web browser application, a widget or gadget engine or another application, and data file 227. Storage medium 221 may store, for use by UE 200, any of a variety of various operating systems or combinations of operating systems.

Storage medium 221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 221 may allow UE 200 to access computer-executable instructions, application programs or the like, stored on transitory or non-transitory memory media, to off-load data, or to upload data. An article of manufacture, such as one utilizing a communication system may be tangibly embodied in storage medium 221, which may comprise a device readable medium.

In FIG. 11, processing circuitry 201 may be configured to communicate with network 243b using communication subsystem 231. Network 243a and network 243b may be the same network or networks or different network or networks. Communication subsystem 231 may be configured to include one or more transceivers used to communicate with network 243b. For example, communication subsystem 231 may be configured to include one or more transceivers used to communicate with one or more remote transceivers of another device capable of wireless communication such as another WD, UE, or base station of a radio access network (RAN) according to one or more communication protocols, such as IEEE 802.QQ2, CDMA, WCDMA, GSM, LTE, UTRAN, WiMax, or the like. Each transceiver may include transmitter 233 and/or receiver 235 to implement transmitter or receiver functionality, respectively, appropriate to the RAN links (e.g., frequency allocations and the like). Further, transmitter 233 and receiver 235 of each transceiver may share circuit components, software or firmware, or alternatively may be implemented separately.

In the illustrated embodiment, the communication functions of communication subsystem 231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 231 may include cellular communication, Wi-Fi communication, Bluetooth communication, and GPS communication. Network 243b may encompass wired and/or wireless networks such as a local-area network (LAN), a wide-area network (WAN), a computer network, a wireless network, a telecommunications network, another like network or any combination thereof. For example, network 243b may be a cellular network, a Wi-Fi network, and/or a near-field network. Power source 213 may be configured to provide alternating current (AC) or direct current (DC) power to components of UE 200.

The features, benefits and/or functions described herein may be implemented in one of the components of UE 200 or partitioned across multiple components of UE 200. Further, the features, benefits, and/or functions described herein may be implemented in any combination of hardware, software or firmware. In one example, communication subsystem 231 may be configured to include any of the components described herein. Further, processing circuitry 201 may be configured to communicate with any of such components over bus 202. In another example, any of such components may be represented by program instructions stored in memory that when executed by processing circuitry 201 perform the corresponding functions described herein. In another example, the functionality of any of such components may be partitioned between processing circuitry 201 and communication subsystem 231. In another example, the non-computationally intensive functions of any of such components may be implemented in software or firmware and the computationally intensive functions may be implemented in hardware.

Figure 12:
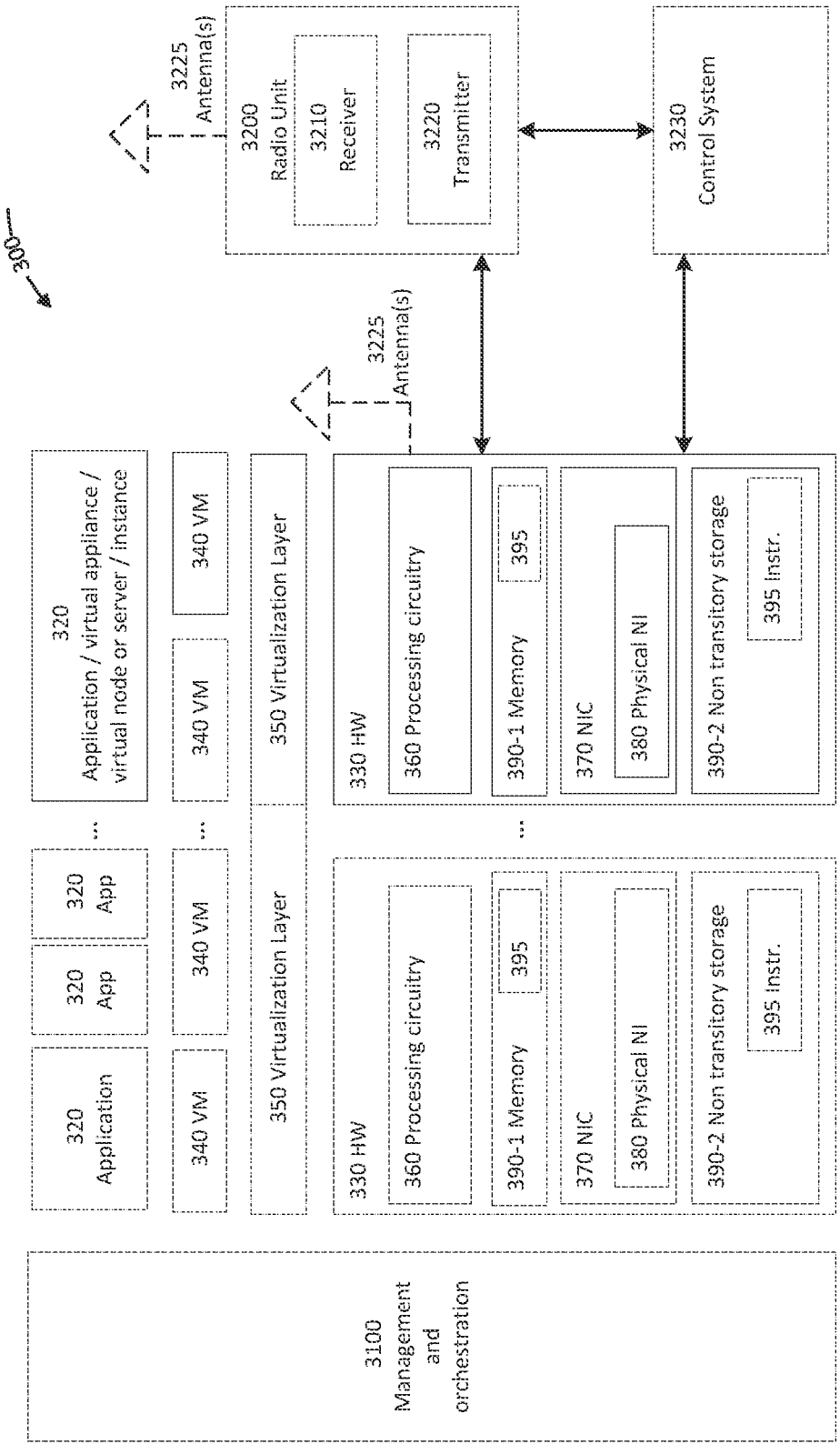
FIG. 12 is a block diagram of a virtualization environment in accordance with some embodiments.

FIG. 12: Virtualization environment in accordance with some embodiments

FIG. 12 is a schematic block diagram illustrating a virtualization environment 300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 300 hosted by one or more of hardware nodes 330. Further, in embodiments in which the virtual node is not a radio access node or does not require radio connectivity (e.g., a core network node), then the network node may be entirely virtualized.

The functions may be implemented by one or more applications 320 (which may alternatively be called software instances, virtual appliances, network functions, virtual nodes, virtual network functions, etc.) operative to implement some of the features, functions, and/or benefits of some of the embodiments disclosed herein. Applications 320 are run in virtualization environment 300 which provides hardware 330 comprising processing circuitry 360 and memory 390. Memory 390 contains instructions 395 executable by processing circuitry 360 whereby application 320 is operative to provide one or more of the features, benefits, and/or functions disclosed herein.

Virtualization environment 300, comprises general-purpose or special-purpose network hardware devices 330 comprising a set of one or more processors or processing circuitry 360, which may be commercial off-the-shelf (COTS) processors, dedicated Application Specific Integrated Circuits (ASICs), or any other type of processing circuitry including digital or analog hardware components or special purpose processors. Each hardware device may comprise memory 390-1 which may be non-persistent memory for temporarily storing instructions 395 or software executed by processing circuitry 360. Each hardware device may comprise one or more network interface controllers (NICs) 370, also known as network interface cards, which include physical network interface 380. Each hardware device may also include non-transitory, persistent, machine-readable storage media 390-2 having stored therein software 395 and/or instructions executable by processing circuitry 360. Software 395 may include any type of software including software for instantiating one or more virtualization layers 350 (also referred to as hypervisors), software to execute virtual machines 340 as well as software allowing it to execute functions, features and/or benefits described in relation with some embodiments described herein.

Virtual machines 340, comprise virtual processing, virtual memory, virtual networking or interface and virtual storage, and may be run by a corresponding virtualization layer 350 or hypervisor. Different embodiments of the instance of virtual appliance 320 may be implemented on one or more of virtual machines 340, and the implementations may be made in different ways.

During operation, processing circuitry 360 executes software 395 to instantiate the hypervisor or virtualization layer 350, which may sometimes be referred to as a virtual machine monitor (VMM). Virtualization layer 350 may present a virtual operating platform that appears like networking hardware to virtual machine 340.

As shown in FIG. 12, hardware 330 may be a standalone network node with generic or specific components. Hardware 330 may comprise antenna 3225 and may implement some functions via virtualization. Alternatively, hardware 330 may be part of a larger cluster of hardware (e.g. such as in a data center or customer premise equipment (CPE)) where many hardware nodes work together and are managed via management and orchestration (MANO) 3100, which, among others, oversees lifecycle management of applications 320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 340 may be a software implementation of a physical machine that runs programs as if they were executing on a physical, non-virtualized machine. Each of virtual machines 340, and that part of hardware 330 that executes that virtual machine, be it hardware dedicated to that virtual machine and/or hardware shared by that virtual machine with others of the virtual machines 340, forms a separate virtual network elements (VNE).

Still in the context of NFV, Virtual Network Function (VNF) is responsible for handling specific network functions that run in one or more virtual machines 340 on top of hardware networking infrastructure 330 and corresponds to application 320 in FIG. 12.

In some embodiments, one or more radio units 3200 that each include one or more transmitters 3220 and one or more receivers 3210 may be coupled to one or more antennas 3225. Radio units 3200 may communicate directly with hardware nodes 330 via one or more appropriate network interfaces and may be used in combination with the virtual components to provide a virtual node with radio capabilities, such as a radio access node or a base station.

In some embodiments, some signalling can be effected with the use of control system 3230 which may alternatively be used for communication between the hardware nodes 330 and radio units 3200.

Figure 13:
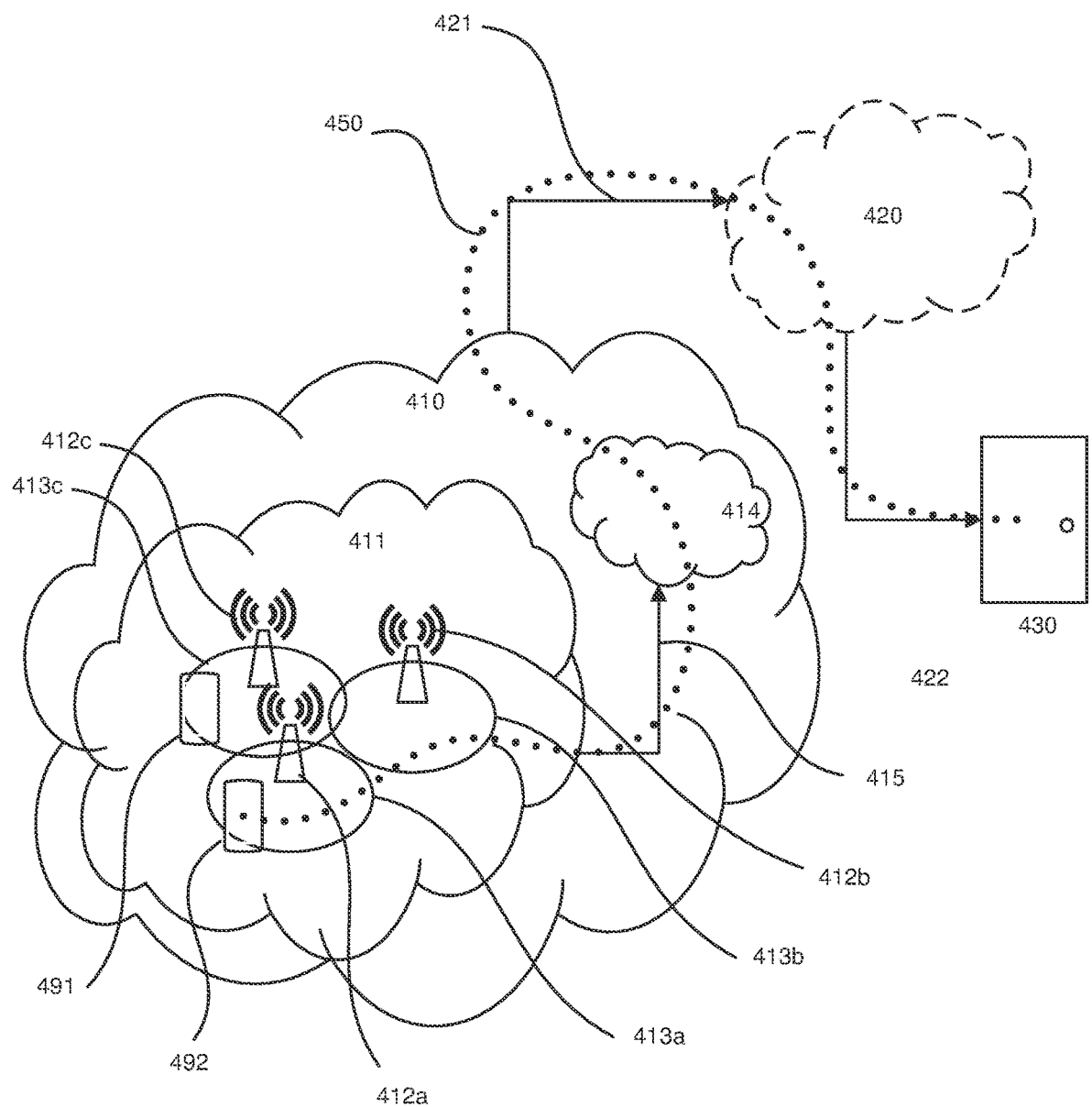
FIG. 13 is a block diagram of a telecommunication network connected via an intermediate network to a host computer in accordance with some embodiments.

FIG. 13: Telecommunication network connected via an intermediate network to a host computer in accordance with some embodiments.

With reference to FIG. 13, in accordance with an embodiment, a communication system includes telecommunication network 410, such as a 3GPP-type cellular network, which comprises access network 411, such as a radio access network, and core network 414. Access network 411 comprises a plurality of base stations 412a, 412b, 412c, such as NBs, eNBs, gNBs or other types of wireless access points, each defining a corresponding coverage area 413a, 413b, 413c. Each base station 412a, 412b, 412c is connectable to core network 414 over a wired or wireless connection 415. A first UE 491 located in coverage area 413c is configured to wirelessly connect to, or be paged by, the corresponding base station 412c. A second UE 492 in coverage area 413a is wirelessly connectable to the corresponding base station 412a. While a plurality of UEs 491, 492 are illustrated in this example, the disclosed embodiments are equally applicable to a situation where a sole UE is in the coverage area or where a sole UE is connecting to the corresponding base station 412.

Telecommunication network 410 is itself connected to host computer 430, which may be embodied in the hardware and/or software of a standalone server, a cloud-implemented server, a distributed server or as processing resources in a server farm. Host computer 430 may be under the ownership or control of a service provider, or may be operated by the service provider or on behalf of the service provider. Connections 421 and 422 between telecommunication network 410 and host computer 430 may extend directly from core network 414 to host computer 430 or may go via an optional intermediate network 420. Intermediate network 420 may be one of, or a combination of more than one of, a public, private or hosted network; intermediate network 420, if any, may be a backbone network or the Internet; in particular, intermediate network 420 may comprise two or more subnetworks (not shown).

The communication system of FIG. 13 as a whole enables connectivity between the connected UEs 491, 492 and host computer 430. The connectivity may be described as an over-the-top (OTT) connection 450. Host computer 430 and the connected UEs 491, 492 are configured to communicate data and/or signaling via OTT connection 450, using access network 411, core network 414, any intermediate network 420 and possible further infrastructure (not shown) as intermediaries. OTT connection 450 may be transparent in the sense that the participating communication devices through which OTT connection 450 passes are unaware of routing of uplink and downlink communications. For example, base station 412 may not or need not be informed about the past routing of an incoming downlink communication with data originating from host computer 430 to be forwarded (e.g., handed over) to a connected UE 491. Similarly, base station 412 need not be aware of the future routing of an outgoing uplink communication originating from the UE 491 towards the host computer 430.

Figure 14:
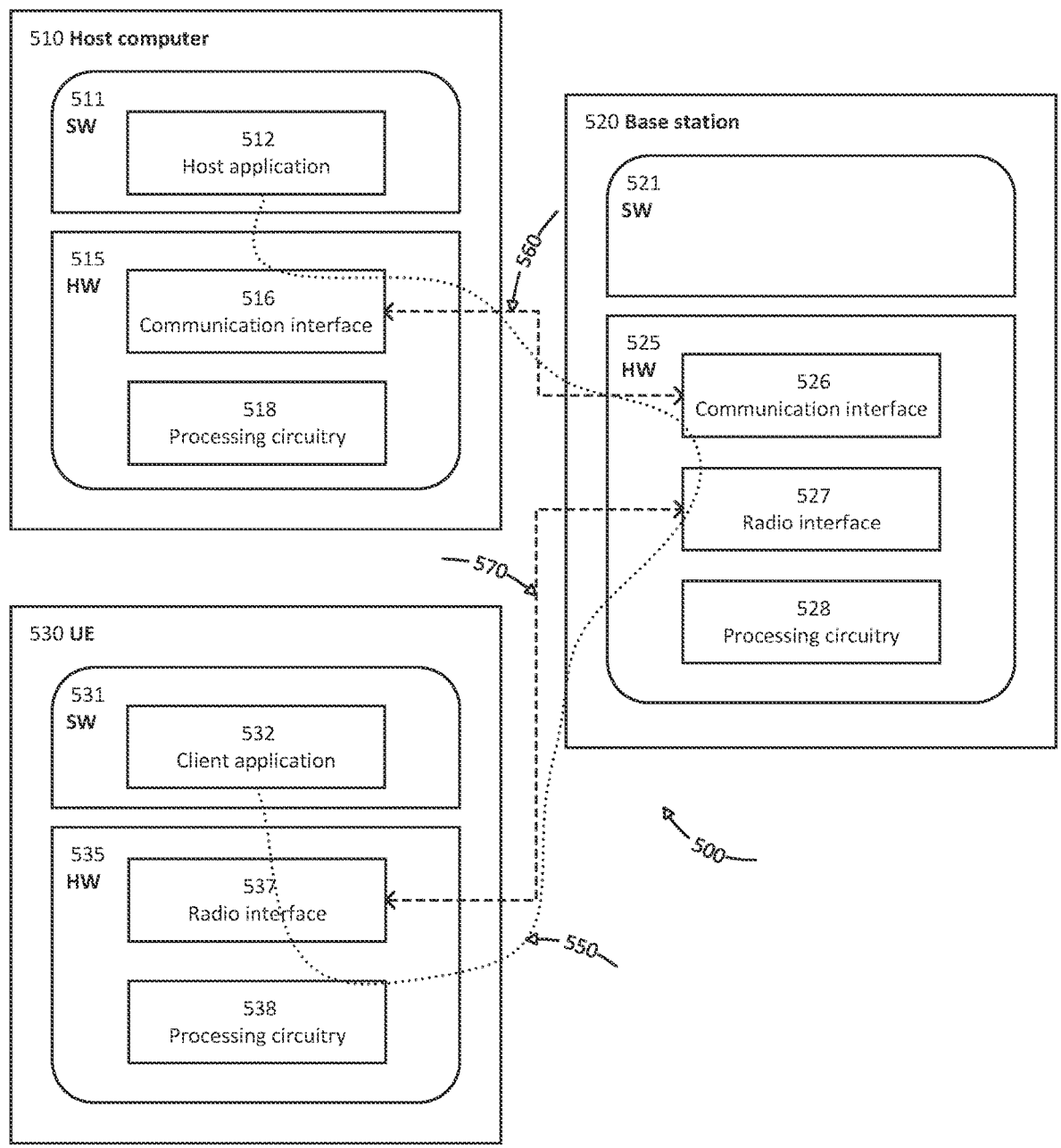
FIG. 14 is a block diagram of a host computer communicating via a base station with a user equipment over a partially wireless connection in accordance with some embodiments.

FIG. 14: Host computer communicating via a base station with a user equipment over a partially wireless connection in accordance with some embodiments.

Example implementations, in accordance with an embodiment, of the UE, base station and host computer discussed in the preceding paragraphs will now be described with reference to FIG. 14. In communication system 500, host computer 510 comprises hardware 515 including communication interface 516 configured to set up and maintain a wired or wireless connection with an interface of a different communication device of communication system 500. Host computer 510 further comprises processing circuitry 518, which may have storage and/or processing capabilities. In particular, processing circuitry 518 may comprise one or more programmable processors, application-specific integrated circuits, field programmable gate arrays or combinations of these (not shown) adapted to execute instructions. Host computer 510 further comprises software 511, which is stored in or accessible by host computer 510 and executable by processing circuitry 518. Software 511 includes host application 512. Host application 512 may be operable to provide a service to a remote user, such as UE 530 connecting via OTT connection 550 terminating at UE 530 and host computer 510. In providing the service to the remote user, host application 512 may provide user data which is transmitted using OTT connection 550.

Communication system 500 further includes base station 520 provided in a telecommunication system and comprising hardware 525 enabling it to communicate with host computer 510 and with UE 530. Hardware 525 may include communication interface 526 for setting up and maintaining a wired or wireless connection with an interface of a different communication device of communication system 500, as well as radio interface 527 for setting up and maintaining at least wireless connection 570 with UE 530 located in a coverage area (not shown in FIG. 14) served by base station 520. Communication interface 526 may be configured to facilitate connection 560 to host computer 510. Connection 560 may be direct or it may pass through a core network (not shown in FIG. 14) of the telecommunication system and/or through one or more intermediate networks outside the telecommunication system. In the embodiment shown, hardware 525 of base station 520 further includes processing circuitry 528, which may comprise one or more programmable processors, application-specific integrated circuits, field programmable gate arrays or combinations of these (not shown) adapted to execute instructions. Base station 520 further has software 521 stored internally or accessible via an external connection.

Communication system 500 further includes UE 530 already referred to. Its hardware 535 may include radio interface 537 configured to set up and maintain wireless connection 570 with a base station serving a coverage area in which UE 530 is currently located. Hardware 535 of UE 530 further includes processing circuitry 538, which may comprise one or more programmable processors, application-specific integrated circuits, field programmable gate arrays or combinations of these (not shown) adapted to execute instructions. UE 530 further comprises software 531, which is stored in or accessible by UE 530 and executable by processing circuitry 538. Software 531 includes client application 532. Client application 532 may be operable to provide a service to a human or non-human user via UE 530, with the support of host computer 510. In host computer 510, an executing host application 512 may communicate with the executing client application 532 via OTT connection 550 terminating at UE 530 and host computer 510. In providing the service to the user, client application 532 may receive request data from host application 512 and provide user data in response to the request data. OTT connection 550 may transfer both the request data and the user data. Client application 532 may interact with the user to generate the user data that it provides.

It is noted that host computer 510, base station 520 and UE 530 illustrated in FIG. 14 may be similar or identical to host computer 430, one of base stations 412a, 412b, 412c and one of UEs 491, 492 of FIG. 13, respectively. This is to say, the inner workings of these entities may be as shown in FIG. 14 and independently, the surrounding network topology may be that of FIG. 13.

In FIG. 14, OTT connection 550 has been drawn abstractly to illustrate the communication between host computer 510 and UE 530 via base station 520, without explicit reference to any intermediary devices and the precise routing of messages via these devices. Network infrastructure may determine the routing, which it may be configured to hide from UE 530 or from the service provider operating host computer 510, or both. While OTT connection 550 is active, the network infrastructure may further take decisions by which it dynamically changes the routing (e.g., on the basis of load balancing consideration or reconfiguration of the network).

Wireless connection 570 between UE 530 and base station 520 is in accordance with the teachings of the embodiments described throughout this disclosure. One or more of the various embodiments may improve the performance of OTT services provided to UE 530 using OTT connection 550, in which wireless connection 570 forms the last segment. More precisely, the teachings of these embodiments may improve the deblock filtering for video processing and thereby provide benefits such as improved video encoding and/or decoding.

A measurement procedure may be provided for the purpose of monitoring data rate, latency and other factors on which the one or more embodiments improve. There may further be an optional network functionality for reconfiguring OTT connection 550 between host computer 510 and UE 530, in response to variations in the measurement results. The measurement procedure and/or the network functionality for reconfiguring OTT connection 550 may be implemented in software 511 and hardware 515 of host computer 510 or in software 531 and hardware 535 of UE 530, or both. In embodiments, sensors (not shown) may be deployed in or in association with communication devices through which OTT connection 550 passes; the sensors may participate in the measurement procedure by supplying values of the monitored quantities exemplified above, or supplying values of other physical quantities from which software 511, 531 may compute or estimate the monitored quantities. The reconfiguring of OTT connection 550 may include message format, retransmission settings, preferred routing etc.; the reconfiguring need not affect base station 520, and it may be unknown or imperceptible to base station 520. Such procedures and functionalities may be known and practiced in the art. In certain embodiments, measurements may involve proprietary UE signaling facilitating host computer 510's measurements of throughput, propagation times, latency and the like. The measurements may be implemented in that software 511 and 531 causes messages to be transmitted, in particular empty or 'dummy' messages, using OTT connection 550 while it monitors propagation times, errors etc.

Figure 15:
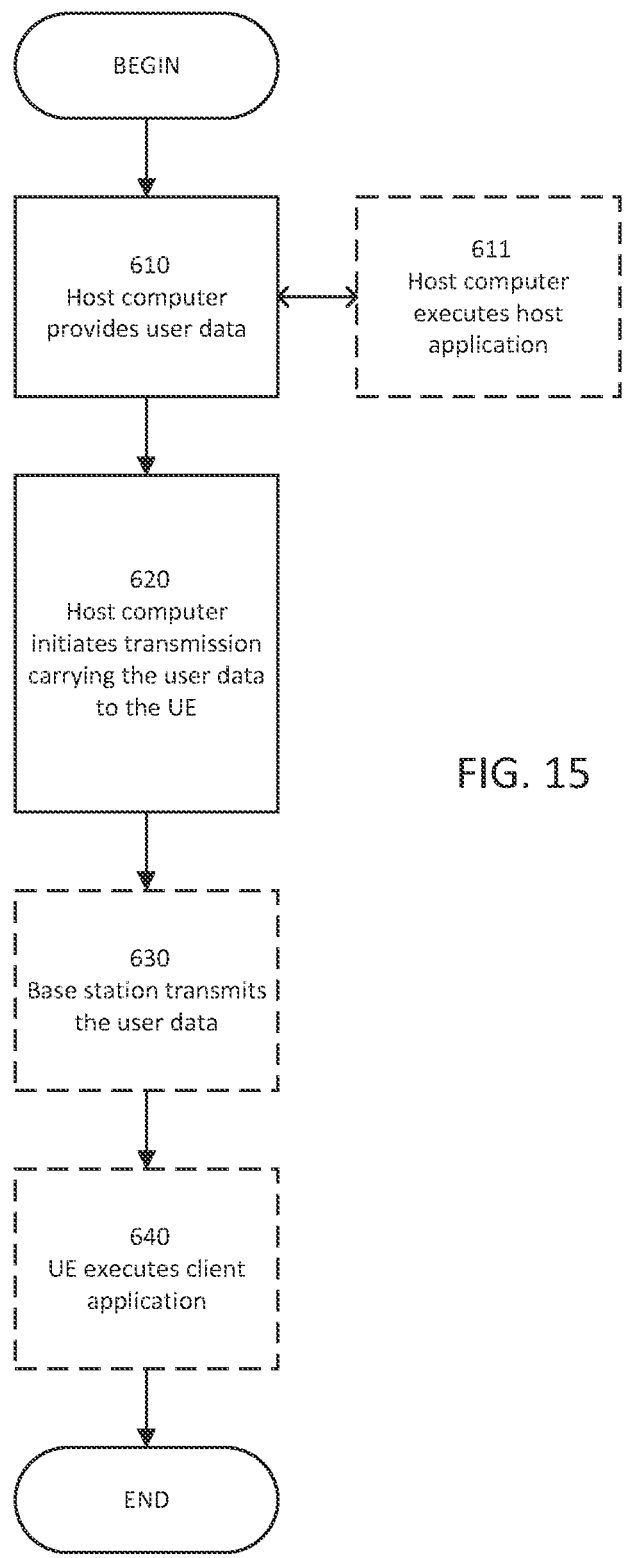
FIG. 15 is a block diagram of methods implemented in a communication system including a host computer, a base station and a user equipment in accordance with some embodiments.

FIG. 15: Methods implemented in a communication system including a host computer, a base station and a user equipment in accordance with some embodiments.

FIG. 15 is a flowchart illustrating a method implemented in a communication system, in accordance with one embodiment. The communication system includes a host computer, a base station and a UE which may be those described with reference to FIGS. 13 and 14. For simplicity of the present disclosure, only drawing references to FIG. 15 will be included in this section. In step 610, the host computer provides user data. In substep 611 (which may be optional) of step 610, the host computer provides the user data by executing a host application. In step 620, the host computer initiates a transmission carrying the user data to the UE. In step 630 (which may be optional), the base station transmits to the UE the user data which was carried in the transmission that the host computer initiated, in accordance with the teachings of the embodiments described throughout this disclosure. In step 640 (which may also be optional), the UE executes a client application associated with the host application executed by the host computer.

Figure 16:
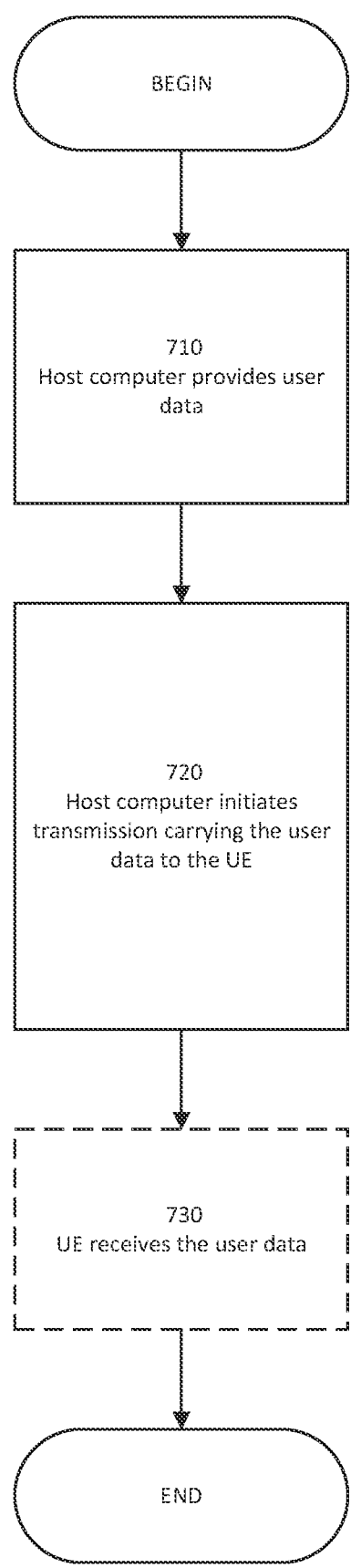
FIG. 16 is a block diagram of methods implemented in a communication system including a host computer, a base station and a user equipment in accordance with some embodiments.

FIG. 16: Methods implemented in a communication system including a host computer, a base station and a user equipment in accordance with some embodiments.

FIG. 16 is a flowchart illustrating a method implemented in a communication system, in accordance with one embodiment. The communication system includes a host computer, a base station and a UE which may be those described with reference to FIGS. 13 and 14. For simplicity of the present disclosure, only drawing references to FIG. 16 will be included in this section. In step 710 of the method, the host computer provides user data. In an optional substep (not shown) the host computer provides the user data by executing a host application. In step 720, the host computer initiates a transmission carrying the user data to the UE. The transmission may pass via the base station, in accordance with the teachings of the embodiments described throughout this disclosure. In step 730 (which may be optional), the UE receives the user data carried in the transmission.

Figure 17:
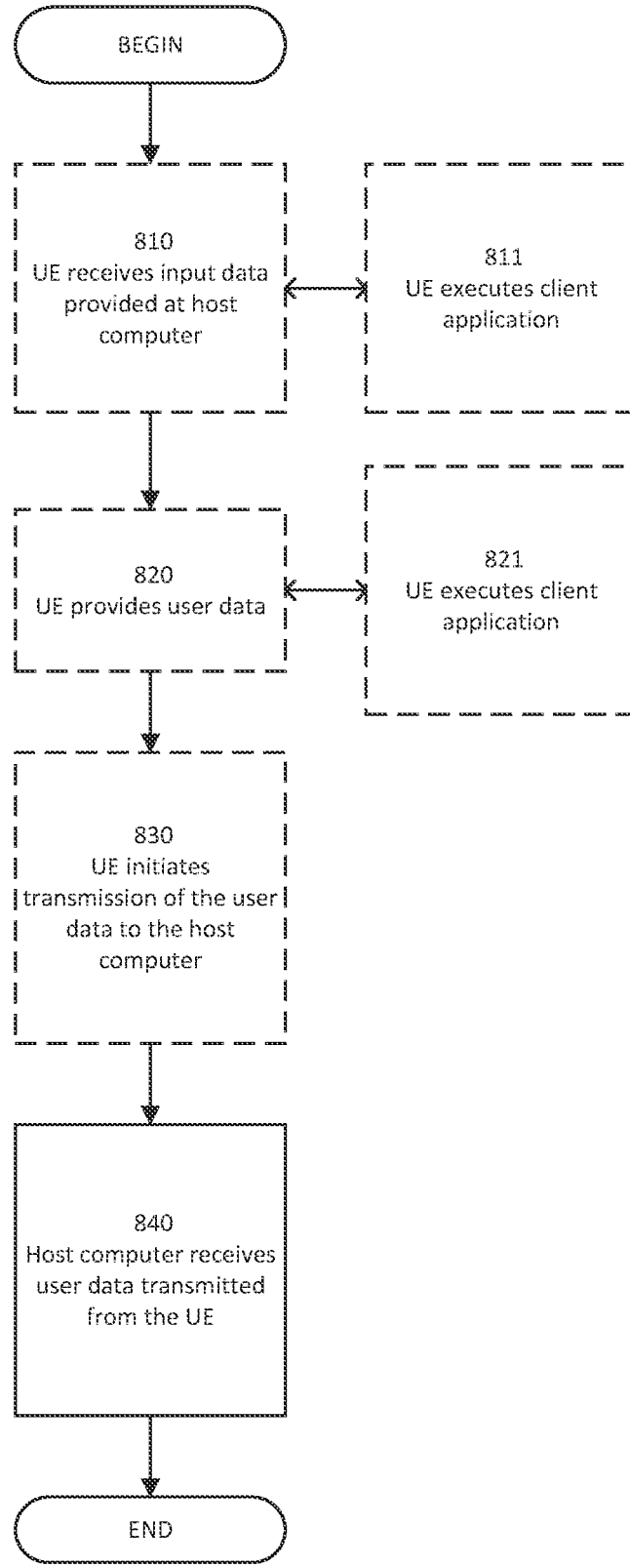
FIG. 17 is a block diagram of methods implemented in a communication system including a host computer, a base station and a user equipment in accordance with some embodiments.

FIG. 17: Methods implemented in a communication system including a host computer, a base station and a user equipment in accordance with some embodiments.

FIG. 17 is a flowchart illustrating a method implemented in a communication system, in accordance with one embodiment. The communication system includes a host computer, a base station and a UE which may be those described with reference to FIGS. 13 and 14. For simplicity of the present disclosure, only drawing references to FIG. 17 will be included in this section. In step 810 (which may be optional), the UE receives input data provided by the host computer. Additionally or alternatively, in step 820, the UE provides user data. In substep 821 (which may be optional) of step 820, the UE provides the user data by executing a client application. In substep 811 (which may be optional) of step 810, the UE executes a client application which provides the user data in reaction to the received input data provided by the host computer. In providing the user data, the executed client application may further consider user input received from the user. Regardless of the specific manner in which the user data was provided, the UE initiates, in substep 830 (which may be optional), transmission of the user data to the host computer. In step 840 of the method, the host computer receives the user data transmitted from the UE, in accordance with the teachings of the embodiments described throughout this disclosure.

Figure 18:
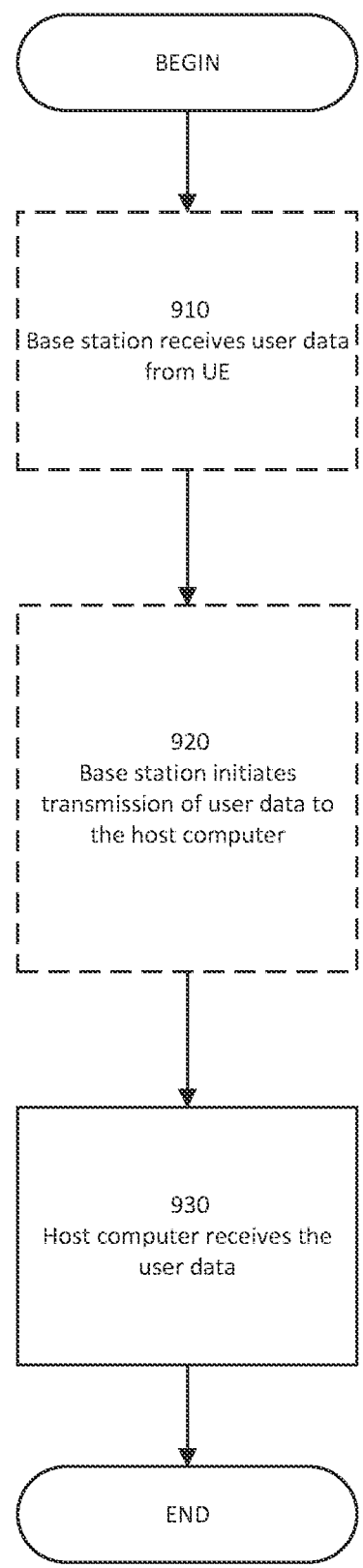
FIG. 18 is a block diagram of methods implemented in a communication system including a host computer, a base station and a user equipment in accordance with some embodiments.

FIG. 18: Methods implemented in a communication system including a host computer, a base station and a user equipment in accordance with some embodiments.

FIG. 18 is a flowchart illustrating a method implemented in a communication system, in accordance with one embodiment. The communication system includes a host computer, a base station and a UE which may be those described with reference to FIGS. 13 and 14. For simplicity of the present disclosure, only drawing references to FIG. 18 will be included in this section. In step 910 (which may be optional), in accordance with the teachings of the embodiments described throughout this disclosure, the base station receives user data from the UE. In step 920 (which may be optional), the base station initiates transmission of the received user data to the host computer. In step 930 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

The invention claimed is:

1. A method of operating a Master gNodeB, MgNB, in a radio access network, RAN, the method comprising:
    receiving from a core network node an indication of a user plane security policy requiring user plane integrity protection for a protocol data unit, PDU, session;
    responsive to the user plane security policy requiring user plane integrity protection for the PDU session and responsive to determining that a secondary base station supporting the user plane security policy requiring user plane integrity protection is unavailable, establishing a data radio bearer, DRB, of the PDU session directly between the MgNB and a user equipment, UE; and
    providing dual connectivity with the UE using the DRB of the PDU session directly between the secondary base station and the UE and using a second DRB of the PDU session directly between the MgNB and the UE responsive to the user plane security policy requiring user plane integrity protection for the PDU session and responsive to determining that the secondary base station supporting the user plane security policy requiring user plane integrity protection is available for the UE.

2. The method of claim 1, further comprising:
    before establishing the DRB directly between the MgNB and the UE, determining whether to offload the DRB of the PDU session to the secondary base station.

3. The method of claim 1, wherein the secondary base station comprises at least one of a gNB or an ng-eNB.

4. The method of claim 1, wherein the indication of the security policy is received from the core network node over an N2 interface.

5. The method of claim 1, further comprising:
    before establishing the DRB directly between the MgNB and the UE, determining to attempt to offload the DRB of the PDU session to the secondary base station that is available to the UE;
    wherein the DRB of the PDU session is established directly between the MgNB and the UE responsive to determining that the secondary base station that is available to the UE does not support the user plane security policy based on the secondary base station that is available to the UE being included in a blacklist, wherein the MgNB maintains the blacklist.

6. The method of claim 1, further comprising:
    before establishing the DRB directly between the MgNB and the UE, determining to attempt to offload the DRB of the PDU session to the secondary base station that is available to the UE;
    wherein the DRB of the PDU session is established directly between the MgNB and the UE responsive to determining that the secondary base station that is available to the UE does not support the user plane security policy based on the secondary base station that is available to the UE being omitted from a whitelist, wherein MgNB maintains the whitelist.

7. The method of claim 1, wherein the UE is a first UE, wherein the user plane security policy is a first user plane security policy, wherein the PDU session is a first PDU session for the first UE, wherein the DRB is a first DRB, and wherein determining that a secondary base station supporting the first user plane security policy is unavailable comprises determining that a first secondary base station for the first UE does not support the first user plane security policy requiring user plane integrity protection for the first PDU session, the method further comprising:
    receiving an indication of a second user plane security policy requiring user plane integrity protection for a second PDU session for a second UE; and
    responsive to the second user plane security policy requiring user plane integrity protection for the second PDU session and responsive to determining that a second secondary base station supporting the second user plane security policy requiring user plane integrity protection is available for the second UE, providing dual connectivity with the second UE using a second DRB of the second PDU session directly between the second secondary base station and the UE and using a third DRB of the second PDU session directly between the MgNB and the second UE.

8. A master gNodeB, MgNB, of a radio access network, the MgNB comprising:
a transceiver configured to provide wireless network communication with a user equipment, UE;
a network interface configured to provide communication with other nodes of the radio access network; and
a processor coupled with the transceiver and the network interface, wherein the processor is configured to provide wireless communication with the UE through the transceiver, wherein the processor is configured to provide network communication with other nodes of the radio access network through the network interface, and wherein the processor is configured to;
receive from a core network node an indication of a user plane security policy requiring user plane integrity protection for a protocol data unit, PDU, session, and
establish a data radio bearer, DRB, of the PDU session directly between the MgNB and a user equipment, UE, responsive to the user plane security policy requiring user plane integrity protection for the PDU session and responsive to determining that a secondary base station supporting the user plane security policy requiring user plane integrity protection is unavailable; and
provide dual connectivity with the UE using the DRB of the PDU session directly between the secondary base station and the UE and using a second DRB of the PDU session directly between the MgNB and the UE responsive to the user plane security policy requiring user plane integrity protection for the PDU session and responsive to determining that the secondary base station supporting the user plane security policy requiring user plane integrity protection is available for the UE.

9. The MgNB of claim 8, wherein the processor is further configured to:
determine whether to offload the DRB of the PDU session to the secondary base station before establishing the DRB directly between the MgNB and the UE.

10. The MgNB of claim 8, wherein the processor is further configured to:
determine to attempt to offload the DRB of the PDU session to the secondary base station that is available to the UE before establishing the DRB directly between the MgNB and the UE;
wherein the DRB of the PDU session is established directly between the MgNB and the UE responsive to determining that the secondary base station that is available to the UE does not support the user plane security policy based on the secondary base station that is available to the UE being included in a blacklist, wherein the MgNB maintains the blacklist.

11. The MgNB of claim 8, wherein the processor is further configured to:
determine to attempt to offload the DRB of the PDU session to the secondary base station that is available to the UE before establishing the DRB directly between the MgNB and the UE;
wherein the DRB of the PDU session is established directly between the MgNB and the UE responsive to determining that the secondary base station that is available to the UE does not support the user plane security policy based on the secondary base station that is available to the UE being omitted from a whitelist, wherein the MgNB maintains the whitelist.

12. A master gNodeB, MgNB, of a radio access network, wherein the MgNB is adapted to:
receive from a core network node an indication of a user plane security policy requiring user plane integrity protection for a protocol data unit, PDU, session, and
establish a data radio bearer, DRB, of the PDU session directly between the MgNB and a user equipment, UE, responsive to the user plane security policy requiring user plane integrity protection for the PDU session and responsive to determining that a secondary base station supporting the user plane security policy requiring user plane integrity protection is unavailable; and
provide dual connectivity with the UE using the DRB of the PDU session directly between the secondary base station and the UE and using a second DRB of the PDU session directly between the MgNB and the UE responsive to the user plane security policy requiring user plane integrity protection for the PDU session and responsive to determining that the secondary base station supporting the user plane security policy requiring user plane integrity protection is available for the UE.

13. The MgNB of claim 12, wherein the MgNB is further adapted to:
determine whether to offload the DRB of the PDU session to the secondary base station before establishing the DRB directly between the MgNB and the UE.

14. The MgNB of claim 12, wherein the secondary base station comprises at least one of a gNB or an ng-eNB.

15. The MgNB of claim 12, wherein the indication of the security policy is received from the core network node over an N2 interface.

16. The MgNB of claim 12, wherein the MgNB is further adapted to:
determine to attempt to offload the DRB of the PDU session to the secondary base station that is available to the UE before establishing the DRB directly between the MgNB and the UE;
wherein the DRB of the PDU session is established directly between the MgNB and the UE responsive to determining that the secondary base station that is available to the UE does not support the user plane security policy based on the secondary base station that is available to the UE being included in a blacklist, wherein the MgNB maintains the blacklist.

17. The MgNB of claim 12, wherein the MgNB is further adapted to:
determine to attempt to offload the DRB of the PDU session to the secondary base station that is available to the UE before establishing the DRB directly between the MgNB and the UE;
wherein the DRB of the PDU session is established directly between the MgNB and the UE responsive to determining that the secondary base station that is available to the UE does not support the user plane security policy based on the secondary base station that is available to the UE being omitted from a whitelist, wherein the MgNB maintains the whitelist.

18. The MgNB of claim 12, wherein the UE is a first UE, wherein the user plane security policy is a first user plane security policy, wherein the PDU session is a first PDU session for the first UE, wherein the DRB is a first DRB, and wherein determining that a secondary base station supporting the first user plane security policy is unavailable comprises determining that a first secondary base station for the first UE does not support the first user plane security policy requiring user plane integrity protection for the first PDU session, wherein the MgNB is further adapted to:
- receive an indication of a second user plane security policy requiring user plane integrity protection for a second PDU session for a second UE, and
- responsive to the second user plane security policy requiring user plane integrity protection for the second PDU session and responsive to determining that a second secondary base station supporting the second user plane security policy requiring user plane integrity protection is available for the second UE, provide dual connectivity with the second UE using a second DRB of the second PDU session directly between the second secondary base station and the UE and using a third DRB of the second PDU session directly between the MgNB and the second UE.

* * * * *